(12) United States Patent
Fradella

(10) Patent No.: US 6,794,777 B1
(45) Date of Patent: Sep. 21, 2004

(54) ROBUST MINIMAL-LOSS FLYWHEEL SYSTEMS

(76) Inventor: Richard Benito Fradella, 33872 Calle Conejo, San Juan Capistrano, CA (US) 92675

(*) Notice: Subject to any disclaimer, the term of this patent is extended or adjusted under 35 U.S.C. 154(b) by 0 days.

(21) Appl. No.: 10/739,119

(22) Filed: Dec. 19, 2003

(51) Int. Cl.⁷ ................................................ H02K 7/02

(52) U.S. Cl. ........................ 310/74; 310/90; 310/90.5; 310/68 B; 310/68 R

(58) Field of Search .......................... 310/74, 90, 90.5, 310/68 B, 68 R

(56) References Cited

U.S. PATENT DOCUMENTS

| | | | | |
|---|---|---|---|---|
| 3,731,984 A | * | 5/1973 | Hberman | 308/10 |
| 5,441,222 A | | 8/1995 | Rosen | |
| 5,495,221 A | | 2/1996 | Post | |
| 5,614,777 A | * | 3/1997 | Bitterly | 310/74 |
| 5,681,012 A | | 10/1997 | Rosmann et al. | |
| 5,783,885 A | | 7/1998 | Post | |
| 5,847,480 A | | 12/1998 | Post | |
| 5,861,690 A | | 1/1999 | Post | |
| 5,883,499 A | | 3/1999 | Post | |
| 5,969,446 A | * | 10/1999 | Eisenhauer | 310/74 |
| 6,166,472 A | | 12/2000 | Pinkerton et al. | |
| 6,262,505 B1 | | 7/2001 | Hockney et al. | |
| 6,288,670 B1 | | 9/2001 | Villani et al. | |
| 6,388,347 B1 | * | 5/2002 | Blake | 310/74 |
| 6,566,775 B1 | | 5/2003 | Fradella | |

* cited by examiner

Primary Examiner—Nicholas Ponomarenko
Assistant Examiner—Iraj A. Mohandesi

(57) ABSTRACT

Electric power is stored in a flywheel system, from a DC power buss, and supplied to the buss, through power electronics associated with a motor/generator, its rotor integral with a flywheel supported by magnetic bearings. The power is reciprocally converted by the motor/generator, controlled by current in its polyphase stator windings, between electricity and kinetic energy. The rotor contains radial-field permanent magnets attached to supporting outer annular high-permeability steel, attached to inner annular steel. This completes a path through the stator windings, for the rotor field, which interacts with current in the windings, to produce torque between the rotor and the stator. Polyphase sinusoidal currents in the stator windings are controlled by the associated electronics, responsive to respective rotation angle sensors and the DC power buss voltage, plus other commands. During normal operation, the rotor assembly is supported by axial attraction of its annular high-permeability axial poles near its top and bottom, to fixed juxtaposed annular magnetic poles above and beneath it. The axial magnetic field also provides passive radial centering. The rotor assembly is released by mechanical backup bearings as magnetic bearings are activated at power-up, and then normally remain disengaged until the last event of a power-down sequence. Axial position stability is provided by axial electromagnets at each end of the rotor assembly. A coil current time-integral is combined with axial position and rate feedback, so that average coil current is continuously adjusted to zero, by axial position adjustment. Radial electromagnets damp flywheel swirling at resonant vibration frequencies, and constrain radial position during possible earth tremors. Affixed to orbital satellites, arrayed 2, 3, or 4 flywheel systems can provide power storage and regeneration as needed. Their radial servos can also provide spin axis precession torques to control satellite attitude.

40 Claims, 19 Drawing Sheets

PRIOR ART

PRIOR ART

PRIOR ART

ROBUST MINIMAL-LOSS FLYWHEEL SYSTEMS

BACKGROUND OF THE INVENTION

Flywheel power storage devices, and the various elements needed for their implementation, have been set forth in the prior art, having various forms and combinations. Numerous recent flywheel patents describe devices intended to serve as electromechanical batteries, which store kinetic energy in a spinning flywheel and generate electric power from it when needed. A safe, cost-competitive, practical and care-free flywheel power storage and regeneration system can provide a very attractive alternative to electrochemical batteries used in UPS (Uninterruptible Power Systems). Electrochemical batteries subjected to frequent deep-discharge have short service lifetimes, low reliability, need for costly and frequent maintenance, temperature limits that may compromise applicability, performance and reliability degradation while in use, and poor energy recovery efficiency. UPS is mostly used as on-site backup for conventional utility power distributed extensively to stationary sites connected to power grids.

In addition to storing and regenerating power onboard a spacecraft, especially an orbital satellite, practical electromechanical batteries, in system combinations, can also provide inertial attitude control for such a spacecraft. Orbital satellites are launched for global communications, radio, television, mapping, weather prediction, and myriad useful purposes.

My present invention includes improvements and enhancements, over teaching set forth in my U.S. Pat. No. 6,566,775. That invention mainly teaches a minimal-loss flywheel battery. It teaches means for achieving virtually zero "idling loss" (an electromechanical battery property that may be compared to electrochemical battery "trickle charge") while its magnetically levitated rotor spins at high speeds, with configurations that avoid magnetic cycling of magnetic materials, and that block and buck eddy currents in stator windings. That patent also teaches motor/generator means for ultra-high electromechanical power conversion efficiencies and nearly zero power loss while coasting at all speeds, and systems that can have virtually unlimited service life without need for maintenance. It also teaches power interface electronics, that exchange current with its DC (direct current) power buss and its motor/generator. And it teaches magnetic levitation means that require virtually zero steady-state power.

A high-speed radial-field regenerative motor, having virtually zero idling losses, is set forth there. It serves as a motor/generator, that alternately stores and regenerates power as needed. Its integral rotor assembly is configured to accommodate high spin speed without disintegrating from centrifugal forces, and to sustain virtually zero idling losses in a vacuum environment. Its power interface electronics controls current between the motor stator and a DC power buss, and is responsive to a variety of command signals. So the power electronics of a number of systems can be connected in parallel, to a DC power buss.

The present invention provides improvements over my U.S. Pat. No. 6,566,775. Both include a radial-field embodiment with non-contacting magnetic levitation, of a regenerative brushless DC motor. It is a flywheel version of the motor taught in my U.S. Pat. No. 4,520,300 for a coreless axial-field ultra-efficient regenerative servo including its electronic power control interface.

The flywheel assembly described in my U.S. Pat. No. 6,566,775 clearly is susceptible to an earthquake that might subject its external support structure to a free-fall. Only gravitational force acts to oppose axial magnetic attraction of its axial magnetic support. So subjecting the system to free-fall would cause the axial servo of its magnetic support to lose control.

Also, during a severe earthquake, the bi-directional current of its axial electromagnet coil may reach high levels at a polarity that induces reverse magnetic field on the concentric axial magnet. That may weaken the magnet by partially demagnetizing it.

Accordingly, an objective of this present invention is to remove those limitations, without increasing overall system losses, complexity, and production cost, or necessitating external devices such as shock absorbing mounts that would only mitigate such external disturbances.

Also, gravitational force is essential to proper operation of the flywheel battery axial and radial servos, described in U.S. Pat. No. 6,566,775. That would preclude use aboard a spacecraft. Accordingly, another objective of the present invention is to provide a "weightless" environment embodiment especially suitable for use on orbital satellites, where flywheel system combinations can provide power storage and regeneration, plus attitude control.

A flywheel system with permanent magnets that support up to 90% of rotor weight is described in U.S. Pat. No. 6,262,505 by Hockney et al. That invention includes a cooperative electromagnet, to stabilize its otherwise unstable magnetic axial support. It also adds nominally 10% to total lift forces. No electromagnet current reversal means are described. So clearly, various external factors, such as an earthquake, or a temperature change that increases the magnet's strength, which might reduce the electromagnet current to zero, would result in loss of axial position control. Also, that invention includes radial journal bearings with shock absorbing properties and clearances selected to limit off-center radial excursions. They would be subject to wear, that would reduce service life and contaminate a crucially needed vacuum.

Other configurations are described in U.S. Pat. Nos. 5,627,419 by Miller; 5,760,510 by Nomura et al; 5,777,414 by Conrad; 5,319,844 by Huang et al; and 5,844,339 by Schroeder et al. Yet other configurations are described in U.S. Pat. Nos. 5,705,902 by Merritt et al; 5,044,944 and 5,311,092 by Fisher; 5,107,151 and 5,677,605 by Cambier et al; 5,670,838 by Everton; also 5,708,312 and 5,767,595 plus 5,770,909 by Rosen et al.

These flywheel systems are representative of prior art that does not quantitatively address their idling losses. Without continual power input, their energy would be typically dissipated in less than an hour, due to high hysteresis and eddy losses. This energy loss, without supplying output power, is far worse than self-discharge exhibited by most electrochemical batteries.

None of these configurations, nor any other prior art, include the minimal-idling-loss means of the motor/generator, power interface electronics, and magnetic support elements, described in U.S. Pat. No. 6,566,775 and improvements plus enhancements thereto of the present invention.

Magnetic levitation without electronic servo loops is described in U.S. Pat. Nos. 5,495,221 and 5,783,885 plus 5,847,480 and 5,861,690 plus 5,883,499 by Post. Magnetic bearings, for use in flywheel batteries, that employ hysteresis and eddy effects, for moving mechanical devices, to adjust physical positions of magnetic materials for axial stability, confront serious stability and reliability problems. Axial lift-off by repulsion forces between fixed conductors and a spinning Halbach magnet array, may result in rotor lift and stabilization at speeds above those needing mechanical bearings for rotor support. But this method confronts high idling losses and high stray magnetic fields, from eddy currents required for both lifting and stabilizing their rotor assembly. Mechanical bearing wear and lubrication would also be troublesome. And they would confront formidable stability problems, because there is so little chance to optimize dynamic behavior. Conversely, the electronic servo loops controlling electromagnet actuators described herein, which comprise key elements of the present invention, are readily optimized.

Vacuum loss in some prior art would necessitate relatively frequent maintenance to keep windage loss at acceptably low levels. In turn, need for a vacuum enclosure that can be opened for frequent maintenance, further degrades the interior vacuum soon after re-closing an enclosure needing flexible seals. They are prone to leaking and outgassing. This problem is so pervasive, that some enclosures have a permanently connected vacuum pump. High temperatures cause mechanical bearing lubricants to boil and some composite fiber flywheel resins to outgas into a relatively small enclosed and evacuated space. In most prior art, the enclosed space has been small, to minimize size and weight of the enclosure, which has thick walls designed to contain a possible exploding flywheel rim. A small enclosure space, with high internal temperatures and materials that outgas, cannot reliably maintain a vacuum.

Laminated core stator motors have ample inductance for pulse-width modulation. But they are very lossy at PWM (Pulse-Width-Modulation) frequencies, and have considerable stator core losses at commutation frequencies. So they have low power conversion efficiency due to high PWM losses, plus high idling losses due to magnetic cycling incurred by the stator core while its permanent-magnet rotor spins (typically with a non-magnetic band around it for high speeds).

A type of motor/generator, known in the art as coreless (because its stator windings are not in slots of salient pole cores), has also been used in some prior art flywheel systems. They incur considerable eddy current losses in their stator windings, which has mistakenly been attributed to skin effect. Those with stepwise commutation also incur rotor hysteresis and eddy loss, when converting power. Rotor heat does not have a high thermal conductivity path to the enclosure, in systems having contactless magnetic bearings, so high rotor temperatures may be incurred. That type of motor/generator is substantially different from those taught in my U.S. Pat. Nos. 4,520,300 and 6,566,775. Moreover, further improvement to the power interface electronics of that motor/generator, to decrease PWM circuit losses while in motor drive mode, is set forth herein.

In some prior art, idling loss has been largely due to friction in mechanical bearings, and to motor/generators and magnetic bearings that magnetically cycle iron as the rotor spins, causing substantial hysteresis and eddy losses. Some prior art also includes many combinations of magnetic bearings that are stabilized and assisted by mechanical bearings of various types. Some use a motor/generator having standard mechanical bearings, coupled to a flywheel by materials having radial compliance to minimize vibration stresses on the mechanical bearings.

Mechanical bearings of some prior art would incur serious heating and wear, running in vacuum at sustained high speed. Very high operating temperatures of critical parts, have been caused by high localized heat generation compounded by low heat transfer, further compounded by lubrication loss accelerated by lubricant boil-off in vacuum. These conditions have resulted in early mechanical bearing wear, their subsequent deterioration, and their high failure rates. Their friction also causes high idling losses, and resulting high self-discharge rates.

Typical prior art motor/generators, used in flywheel assemblies, incur a substantial part of their loss in core laminations subjected to relatively high-frequency PWM current control. Also, idling loss due to iron cores and superconductors, that are magnetically cycled by Halbach array alternated permanent-magnet spinning rotors, causes high self-discharge rates. With such high power conversion and idling loss, excessive heat is generated within the evacuated flywheel enclosure. This heat can cause a variety of failure modes. It also can cause excessive maintenance requirements, which prevent practical and safe installation, of flywheel batteries intended for stationary on-site terrestrial use. Clearly, such maintenance on space satellites is not at all practical, and is dangerous to astronauts who would need to perform it.

U.S. Pat. Nos. 4,961,551 and 5,441,222 plus 6,288,670 by Rosen et al, describe flywheels used in combinations, on space satellites, to control satellite angular orientation. Some are used as devices called reaction wheels. They control angular orientation along axes parallel to the wheel spin axes, from bi-directional reaction torques caused by accelerating or decelerating rotor spin.

Other flywheels are used in devices called control moment gyros. With these devices, torque applied orthogonal to the rotor spin axis results in a proportional angular precession rate, along a mutually perpendicular axis. But their high idling losses preclude their use for power storage and regeneration. And they do not have radial electromagnets that can apply torque for achieving the precession rates needed to control satellite attitude. So they need external torquers and gimbals.

None of these flywheels provide power storage and regeneration, which is mainly provided by electrochemical batteries onboard orbital satellites. Moreover, their mechanical rotor and gimbal bearings incur troublesome lubricant loss, wear-out, and consequent system failures.

Rechargeable electrochemical batteries are commonly used for storing on-site electric power. All types require frequent maintenance, may fail without warning, and deteriorate over time. Their lifetimes are limited to less than ten years—far shorter if subjected to repeated frequent deep charge/discharge cycles or not promptly recharged after supplying power. That is typical at off-grid sites. These battery drawbacks have been a major obstacle to on-site solar and wind power installations. To provide power on demand, such installations require power storage that is subjected to daily and highly variable charge/discharge cycles. Standard test analysis, using failure prediction methods widely accepted by the engineering community, indicate that a practical flywheel system can operate under the same demanding service conditions, with a system mean-time-between-failure exceeding 50 years.

After satellite launch, battery maintenance and replacement are not practical. Benefits of the present invention would be profound, for storing and regenerating power on orbital satellites especially their ability to also provide inertial attitude control, from the same flywheel systems providing UPS. It could provide far higher reliability, than present electrochemical battery UPS plus attitude control by jet thrusters or reaction wheels. Jet thrusters have serious fuel limits, and their valves may stick, causing erratic action and system failure.

Prior art magnetic bearings have also been described for onboard flywheels that operate in a "weightless" space environment, where mechanical bearing lubricants boil off, leading to early mechanical bearing wear-out and failure. The magnetic bearings include various configurations of permanent magnets, and electronic servos to adjust magnetic forces for axial alignment and stabilization. The flywheel systems they teach do not include means for achieving virtually zero idling losses; so they are not suitable for electric power storage and regeneration. They also do not include means for the magnetic bearings to apply torque orthogonal to their flywheel spin axis, to control attitude by precession around a mutually orthogonal axis.

The list of other flywheel and related element patents, included hereabove, represents a very small fraction of many patents, which describe many possible diverse flywheel configurations.

Flywheel power storage systems that are not subject to the aforementioned drawbacks and limitations would afford significant improvement to numerous useful applications. These include on-site UPS to sustain critical electric power functions (during grid power outages) at facilities commonly served by a central power grid, UPS plus power storage for distributed on-site solar and wind power systems, and satellite power storage plus attitude control.

General objectives of this invention are to provide more robust flywheel systems, for stationary installations, without the power losses, maintenance, possible earthquake damage, and malfunctions of prior art flywheel batteries, plus an alternate embodiment to provide power storage and attitude control for orbital satellites.

At high temperature, coercive force of permanent magnets is reduced. In most prior art, this has required critical adjustment of magnetic bearings, imposed higher loads on mechanical bearings or electromagnets that stabilize magnetic rotor support, and caused reduced torque vs. current of motor/generators, with reduced back-EMF vs. rotational speed.

Accordingly, it is a general objective of the present invention, to provide more robust magnetic levitation, for flywheel systems having automatically adjusted bus voltage and axial rotor assembly position, by electronic means described herein.

A primary and specific objective is to provide a flywheel system, which can withstand severe shock and vibration without damage, never subjects its magnets to reverse magnetic fields, and includes means to achieve high signal integrity. It includes a motor/generator with no magnetic hysteresis losses and virtually no eddy current losses; its rotor integral with magnetic bearings that need virtually no steady-state power to drive their axial and radial position stabilizing electromagnets. It will not incur magnetic hysteresis and eddy current losses, and can use low-cost magnets. All embodiments of the present invention include mechanical bearings as emergency backup only, not normally engaged when the rotor is spinning.

Another specific objective of this invention is to add improvements described herein so the system can tolerate earthquakes, including an alternate embodiment that can improve service life and reliability of orbital satellites. Both embodiments include high electromechanical power conversion efficiency means and minimal idling loss taught in my U.S. Pat. No. 6,566,775.

Another objective of this invention is to minimize internal losses and consequent heat in a more robust flywheel assembly which operates in vacuum, to minimize heat transfer needs.

Another objective is to provide a robust flywheel system, without need for mechanical backup bearing lubricants, to remove a cause of vacuum loss in stationary on-site terrestrial applications, prevent need for maintenance, and rely less on mechanical backup bearings.

Another objective is to maintain all electronic components and critical regions therein, at cool temperatures, with minimal temperature cycling. And since electronic power interface losses amount to a considerable part of total system power conversion losses, it is a specific objective to further minimize losses in the power interface H-bridge and related components.

Another specific objective is to provide shields against electro-magnetic-interference (EMI), for the rotor angle sensors and the axial and radial position sensors.

Another objective, consistent with and dependent upon the previous objectives, is to provide a robust flywheel system that does not require maintenance over a very long service lifetime; to reduce maintenance cost and especially to reduce need for access to the flywheel.

Another specific objective, consistent with and dependent upon the previous objectives, is to provide a power-up sequence controlled by electronics responsive to a manual or remote power-up command. This sequence would disengage mechanical rotor support, and then commence rotor spin-up, according to a power-up algorithm described herein.

Another specific objective, consistent with and dependent upon the previous objectives, is to provide a power-down sequence controlled by electronics responsive to a manual or remote user command, or upon sensing internal abnormal vibration. This sequence would inhibit further rotor speed increase, decelerate the rotor if possible by dumping electric power generated by its motor/generator into a discretionary load, and finally re-engage mechanical rotor support, when spin speed is reduced to a prescribed level that the mechanical support can handle.

Another objective of this invention is to reliably detect possible flywheel rim deterioration or seismic shaking, manifested by axial and radial servo activity. Signals from the axial and radial servos initiate the power-down sequence described above. Worst-case rotor spindle capture (that would occur if electronics also fails) will be provided by backup mechanical bearings. Such failsafe rotor capture means can minimize flywheel damage and prevent explosion from possible rim disintegration and possible concurrent electronic power-down control malfunction.

Yet another objective is to provide a flywheel system having virtually unlimited service life without maintenance for orbital space satellites, that can also provide inertial attitude control.

It is a specific objective, to provide magnetic bearings that are more robust; and power interface electronics that are more efficient, over those set forth in my U.S. Pat. No. 6,566,775.

And it is a specific objective, to provide system combinations of an embodiment that can store and regenerate electric power onboard orbital satellites, and also control satellite angular attitude.

Accordingly, flywheel systems and combinations, including their component elements, are herein described, for achieving these objectives, plus other advantages and enhancements. Key manufacturing processes, also needed to achieve these objectives, are also described.

BRIEF SUMMARY OF THE INVENTION

A magnetically levitated rotor support, having a top cylindrical permanent-magnet and concentric axial electromagnet to provide force in an upward axial direction, plus a bottom axial electromagnet to provide force in a downward axial direction, is described herein. This configuration, along with gravity, also provides passive leveling and centering forces. It is intended to provide more robust magnetic bearings that better tolerate earthquakes and even free-fall without damage or interruption of system operation. Also, this configuration does not subject the permanent magnet to a reverse magnetomotive force, which may weaken it. So it is more robust over those set forth in my U.S. Pat. No. 6,566,775.

A second system embodiment intended for use on orbital satellites, includes a magnetically levitated rotor support, having a permanent magnet and axial electromagnet at one end, plus a like permanent magnet and axial electromagnet at an opposite end to provide force in an opposing axial direction. This combination also provides passive radial centering, from axial magnetics, at both ends of the rotor assembly. Spin axis precession torquing means are also set forth herein, to provide inertial attitude control for satellites. Mechanical backup bearings are included, to secure the rotor assembly on the last sequence of power-down, especially during satellite launch. An embodiment is described that also maintains closed high-permeability magnetic paths for both axial magnets, when the rotor assembly is mechanically secured.

My present invention includes the minimal-loss means described in my U.S. Pat. No. 6,566,775. It also sets forth more robust flywheel rotor assembly axial magnetic support means, for electric power storage and regeneration with minimal losses, that can tolerate external shock and vibration including free-fall, that the system might experience during severe earthquakes. It also sets forth axial magnetics configurations wherein magnetic fields from cooperative stabilizing electromagnets cannot weaken associated permanent magnets.

And it sets forth more efficient power interface means, by adding PWM turn-off delay to one switch of each diagonal pair in H-bridges, while they control the motor drive stator current.

The various subsystems and combinations improved by the present invention include:

(1) More robust integral magnetic bearings, with feedback control servos to stabilize rotor assembly centering and adjust rotor axial position for zero long-term bearing loss, and to withstand without damage external shaking that the system may incur during possible earthquakes, in a vertical-axis flywheel system for terrestrial power storage and regeneration.

(2) More efficient electronic power interface circuits, EMI suppression, plus a power-up and power-down sequence, controlled by algorithms described herein.

(3) Combinations of an alternate flywheel embodiment, for ultra-reliable electric power storage and regeneration plus inertial attitude control for space satellites, especially for orbital satellites powered by photovoltaic panels, including means for the magnetic bearings to apply precession control torques. They would provide a more reliable and longer life alternative to the prior art.

Improvements to the art will be apparent from the following description of the invention when considered in conjunction with the accompanying drawings wherein:

BRIEF DESCRIPTION OF THE SEVERAL VIEWS OF THE DRAWINGS

The present invention encompasses several engineering disciplines. They include electronics, magnetics, feedback control systems, rotational dynamics, gas dynamics, materials science, and gyrodynamics. Each discipline has standard terminology and illustration methods, to convey its structures and system combinations in the most concise and understandable way to those persons versed in those disciplines. The descriptions and illustrations herein are intended to convey the most essential features of this present invention accurately, clearly, and concisely.

FIG. 14 and FIG. 15 are designated PRIOR ART because they have been set forth in U.S. Pat. No. 6,566,775.

FIG. 15 illustrates a cross-sectional view of the rolling contact mechanical backup bearing, in a plane perpendicular to the spin axis and through the center of FIG. 14.

DETAILED DESCRIPTION OF THE INVENTION

Figure 1:
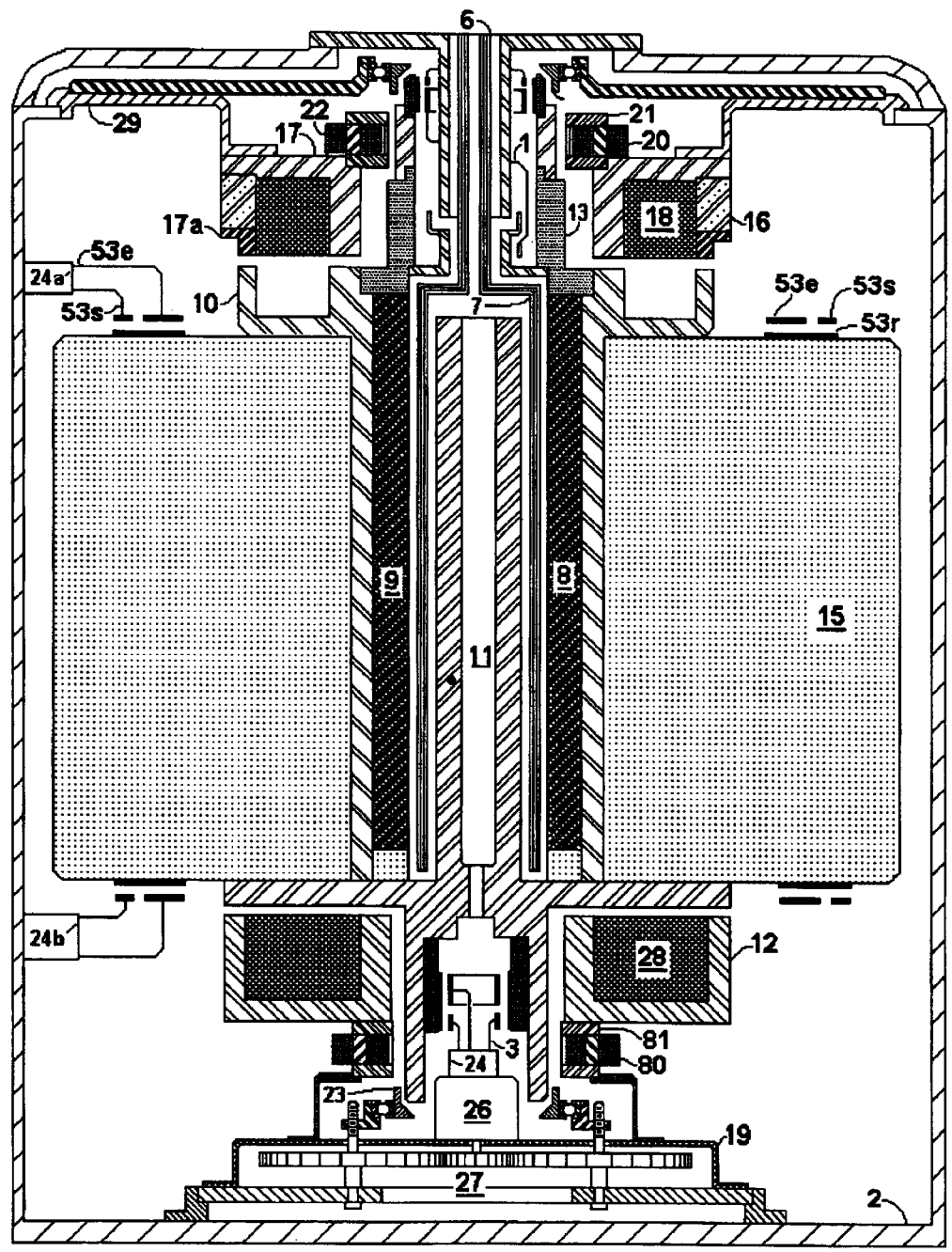
FIG. 1 illustrates a cross-sectional view through the spin-axis, of the flywheel, magnetic bearings, motor/generator, backup mechanical bearings, and stationary vacuum enclosure, for a stationary terrestrial flywheel system. It is in accordance with standard drafting practice. But where exact proportions of the various component sizes are not relevant, it is not drawn to scale, so that it can concisely convey all essential features of the present invention.

A flywheel system is herein described, for storing and regenerating on-site electric power on a DC power buss in a stationary installation, by way of reference to FIG. 1, followed by detailed descriptions of its component elements and general variations. This system converts electric power to stored kinetic energy by the system's regenerative motor (sometimes referred to as a motor/generator because it alternately serves as a motor and a generator).

Kinetic energy is stored by the system through continuous motor control of an integral, high-speed spinning flywheel rotor assembly. DC electric power is then available from the flywheel system, to supply loads on a DC power buss, by regeneration (i.e., conversion from mechanical to electrical power, by the same regenerative motor, driven by flywheel inertia).

Figure 4:
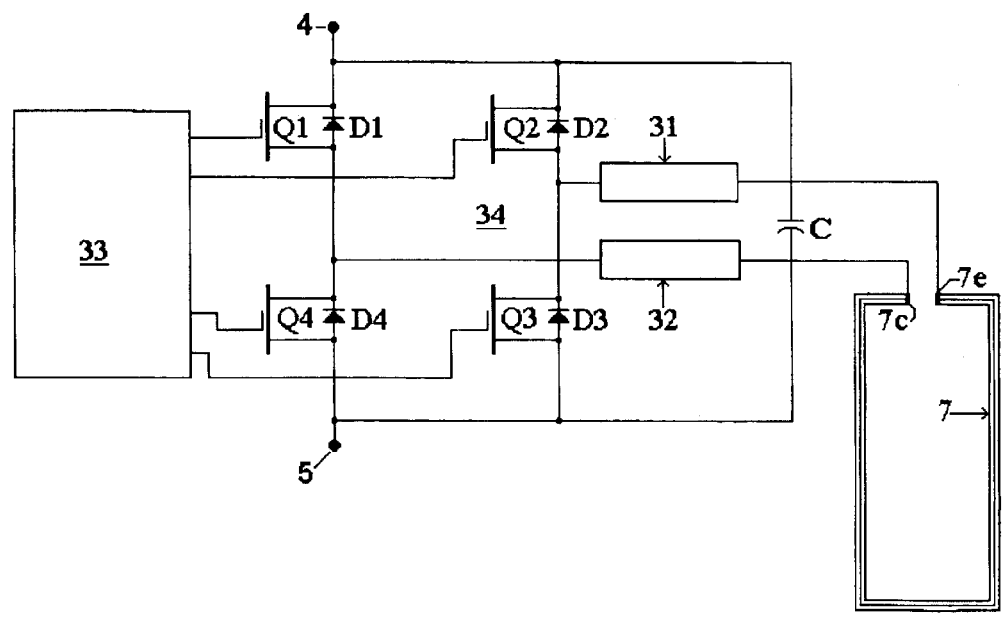
FIG. 4 illustrates motor/generator electronics that control current through a corresponding stator winding, and a simplified representation of its insulated strands. It is designated PRIOR ART because it was set forth in U.S. Pat. No. 6,566,775.

FIG. 1 illustrates a cross-sectional view of a preferred embodiment of the flywheel assembly according to this invention. Most of the system's electronics is housed in a separate enclosure, which interfaces with a DC power buss through respective positive and negative power terminals 4 and 5. Those connections, and connections to signal processing module 33, plus stator winding terminals 7c and 7e, are shown in FIG. 4. A power and feedback signal conduit connects to respective power and signal processing circuits in the electronics enclosure, and through a hermetic feedthrough 6 in flywheel enclosure 2, shown in FIG. 1, to stator windings, electromagnet coils, and flywheel rotor position sensors therein.

A preferred embodiment of this invention will include a conventional circuit breaker having a solenoid actuator with considerable inductance, connected in series between the electronics and the DC power buss. The circuit breaker will disconnect the flywheel battery from the power buss in the event of current overload or line short, thereby preserving all flywheel battery functions and stored energy. Circuit breaker inductance helps to reduce current spikes that could otherwise damage power semiconductors. When the fault causing the circuit breaker to open is corrected, and the circuit breaker re-closed, the flywheel battery will resume normal service.

All electronic circuits will be designed to operate over the full voltage range of the DC power buss. But voltage spikes may be injected onto the buss from a lightning strike, or from a power grid that supplies the buss. Such spikes are usually very short duration (typically microseconds and not over a few milliseconds), and do no circuit damage if the DC buss voltage is clamped. For both terrestrial and space embodiments, in generator mode, the motor/generator control electronics includes voltage feedback plus over-voltage protection, so that it will not inject current onto the buss that can result in buss over-voltage. Electronic circuit and DC buss over-voltage will be prevented with sub-nanosecond response, by a transient voltage suppresser (TVS), similar to a large junction area zener diode. Current through the TVS will be sensed, to directly inhibit and turn off power semiconductors with sub-microsecond response, to prevent the electronics from injecting more current (supplied by the motor/generator) onto the buss. Also, negative voltage feedback to the electronics, from the DC power buss, normally limits current supplied to the buss from the electronics by means of a slower feedback loop, so buss voltage is prevented from rising above prescribed levels by two redundant means.

FIG. 1 shows vacuum enclosure 2, the flywheel rotor assembly having an integral regenerative motor and integral magnetic bearings, and backup mechanical bearings that do not make contact during normal operation. Except for lower mechanical backup bearing 23 (which can be lowered and raised by a jackscrew), all non-rotatable flywheel assembly components are affixed to enclosure 2 by mechanical support members, such as 19 and 29.

Where relative proportions are not relevant to an understanding of the present invention, drawing scale is not exact, in order to clearly and concisely show and identify functional system parts in essential juxtaposition to each other. For example: Viscous drag on the spinning rotor assembly, due to gases within enclosure 2, increases with rotor assembly surface areas and their speeds. It decreases with distance to adjacent stationary surfaces. The outer rim of the flywheel has the biggest surface area and travels at the highest speed. Clearly, viscous drag force is less with more rim distance from the interior cylindrical wall of the enclosure. Viscous drag increases with gas pressure, it can be shown that the enclosure must maintain a vacuum equivalent to about $10^{-6}$ atmosphere, for viscous drag power loss to be less than magnetic hysteresis and eddy current idling losses. Moreover, a larger interior volume would better maintain its vacuum despite outgassing from parts within it. For those reasons, enclosure 2 diameter should be considerably greater than shown in FIG. 1. But to draw the enclosure to such a scale, without exceeding overall drawing size limits, would require all other parts to be so small that important features and identification of interior parts could not be clearly seen or even shown.

Substantially sinusoidal polyphase current through the motor/generator stator windings 7 is conducted through hermetic feed-through 6, controlled by H-bridge power stages of the electronics shown in FIG. 4. The motor/generator control electronics is responsive to substantially sinusoidal feedback signals, preferably from a Hall Effect rotation angle sensor associated with a respective phase, through a feedback conductor typified by its signal lead 1.

This electronics is also responsive to the DC power buss voltage, rotor spin speed, an axial position signal, and to signals from a plurality of radial position sensors at the top and bottom of the rotor spindle. Priority signals can override other input variables to prevent flywheel damage in the event of abnormal vibration due to incipient flywheel rim disintegration or earthquakes.

The motor/generator rotor produces a radial pattern magnetic field having two or more poles (of even number) and magnetic intensity that varies as an approximate sinusoid with rotation angle, in the region between radially magnetized permanent magnets 8 and 9, having respective opposite radial magnet polarities, and high-permeability inner steel core 11. This magnetic field interacts with a magnetic field produced by sinusoidally varying current in stator winding 7 and cosinusoidal current (i.e., at 90° for this 2-phase embodiment) in stator winding 71. These currents are each controlled by an H-bridge, shown in FIG. 4. Its positive polarity top is connected to a DC power buss through terminal 4, and its negative polarity to the buss through terminal 5. The motor/generator is shown as a 2-phase machine in FIG. 3. Another H-bridge, like that shown in FIG. 4, would control current in winding 71.

Rotor magnet flux continues through return paths provided by high-permeability steel core 10, which also physically contains and supports magnets 8 and 9 against high centrifugal forces that accompany high speed rotation. A non-magnetic conductive annular top shoulder 13 constrains the rotor magnets at their top sides, and provides attachment means for high-magnetic-permeability annular member 97 (shown in FIG. 11) that provides an inner closed magnetic path plus magnetic shielding from stator current, for rotation angle sensor 1.

A linear Hall-effect sensor 1 or alternatively a magnetoresistor constitutes the preferred embodiment for each of at least two rotation angle sensors. One such sensor corresponds to each of two or more phases. Magnetic sensors such as these can sense a lower amplitude replica of the magnetic field at the stator windings, provided by the rotor magnets through a relatively long path, partly through non-magnetic cylinder 13. The sensors provide feedback signals which vary sinusoidally in synchronism with back-EMF from a stator winding having corresponding phase. Back-EMF peak amplitude is proportional to speed. Feedback signals from the sensors vary sinusoidally with position only (with peak amplitude independent of speed).

Preferably steel annular member 97, concentric with the spin axis and placed between the stator leads and sensor 1, is also in FIG. 1. It is affixed to the rotor, and spins with it. Also, it provides a closed path for the rotor field through magnetic sensor 1, outside the stator windings. And it provides magnetic shielding for these sensors, from stray magnetic fields caused by stator winding currents. It also minimizes flux cycling of stator iron and stator conductors near it, from the rotor field. Part 97 is attached, via non-magnetic high-conductivity cylinder 13, to high-permeability cylinder 10. Cylinder 13 is non-magnetic, so that it does not lessen field strength from the rotor magnets, at sensor 1. It is also preferably a good conductor, such as aluminum, so that it also provides a Faraday shield around sensor 1 and electrical contact to adjoining parts.

A lower shoulder is attached to annular steel 10 and 11. It supports the rotor magnets at their bottom sides. Outer and inner concentric magnetic cores 10 and 11 support affixed flywheel rim 15. Flywheel rim 15 preferably consists of concentric fiber composite cylinders, with an elastomeric resin bond between each cylinder. To minimize cost, the cylinder capable of the highest working tensile stress would have the largest diameter, and lower cost (albeit lower strength) cylinders would be used for successively smaller diameters. Flywheel rim 15 inner diameter may be bonded to annular steel 10 by an elastomeric resin which can be slowly cured in a vacuum while spinning. Such a production process can minimize later long-term outgassing and radial eccentricity of fiber composite rims.

To minimize outgassing during a required long service lifetime, resins used with fiber composite materials should also be cured slowly in vacuum. The flywheel rim may also be fabricated from aluminum or titanium alloys. Although these solid metals are heavier than fiber composites (which some fiber composite developers claim to have higher tensile strength than these alloys), production processes to minimize later long-term outgassing would be simplified with the metal rims. And early production costs would be considerably less.

High-permeability steels (mainly 10 and 11) complete the magnetic paths for the regenerative motor rotor magnets. They are affixed to each other, so they rotate together, as taught in U.S. Pat. No. 6,566,775. The field resulting from polyphase sinusoidal stator current rotates always in synchronization with the rotor. So rotor steel and magnets do not incur magnetic cycling. Their hysteresis and eddy losses are thus virtually zero. In contrast, much of the prior art contains rotating and non-rotating magnets and magnetic materials in alternating or highly variable fields, so as to incur magnetic cycling and resultant high hysteresis loss. Prior art permanent-magnet rotor motors, having laminated iron salient pole stator cores, are one example. Magnets and electromagnets of magnetic bearings, which levitate high-permeability cylinders rotating around horizontal axes in particular, provide another example of such lossy prior art.

This motor/generator embodiment is a high-speed adaptation based upon principles of the general and the coreless axial-field regenerative servo motor set forth in my U.S. Pat. Nos. 4,085,355 and 4,520,300. Eddy current blocking and bucking methods taught in my U.S. Pat. No. 6,566,775 are also set forth herein, with reference to FIG. 3, FIG. 3a, and FIG. 4. These methods can significantly reduce idling losses, due to eddy currents in stator windings of this coreless motor/generator. Those attributes are included in the present invention.

A bottom electromagnet is included in the present invention, to provide more robust axial magnetics to support the flywheel rotor, than means taught in U.S. Pat. No. 6,566,775. It is shown in FIG. 1 as high-permeability core 12 and concentric coil 28, cooperative with rotor steel member 11. This difference is also shown, in the axial servo loop block diagram illustrated by FIG. 2. No permanent magnet is included in the bottom axial magnetics of this embodiment. To do so would increase steady-state lift forces needed from the top axial magnetics.

Significantly, the FIG. 1 configuration provides an axial servo that does not rely on gravity as the only downward force. And it provides a controlled and variable downward force, so the system can tolerate free-fall (possibly from an earthquake) without loss of axial servo control. Also, the axial magnetics configurations of the present invention do not subject any permanent magnets to reverse magnetomotive force.

The motor/generator set forth herein includes the improvements and enhancements taught in U.S. Pat. No. 6,566,775 to achieve virtually zero magnetic hysteresis losses. Its high-permeability steel and magnets are not subjected to magnetic flux cycling, nor to magnetic flux variation, due to rotor spin or to interaction with stator current.

With reference to FIG. 1, the rotor assembly, having a vertical spin-axis and affixed flywheel rim 15, is axially levitated by attraction forces between concentric high permeability steel poles at the upper end of rotating member 10, the lower side of non-rotating, annular, axially-magnetized, permanent-magnet ring 16, and the lower side of non-rotating, high-permeability, annular steel 17, affixed to enclosure 2 by support member 29. As a preferred embodiment, high-permeability ring 17a is included, to concentrate flux and equalize any possible nonuniform flux from associated magnet 16.

According to the present invention, top coil 18 and bottom coil 28 can be alternately driven. Their currents are unidirectional. So only one PWM transistor switch is needed for each coil. Associated axial servo electronics is responsive to an axial position sensor.

Figure 2:
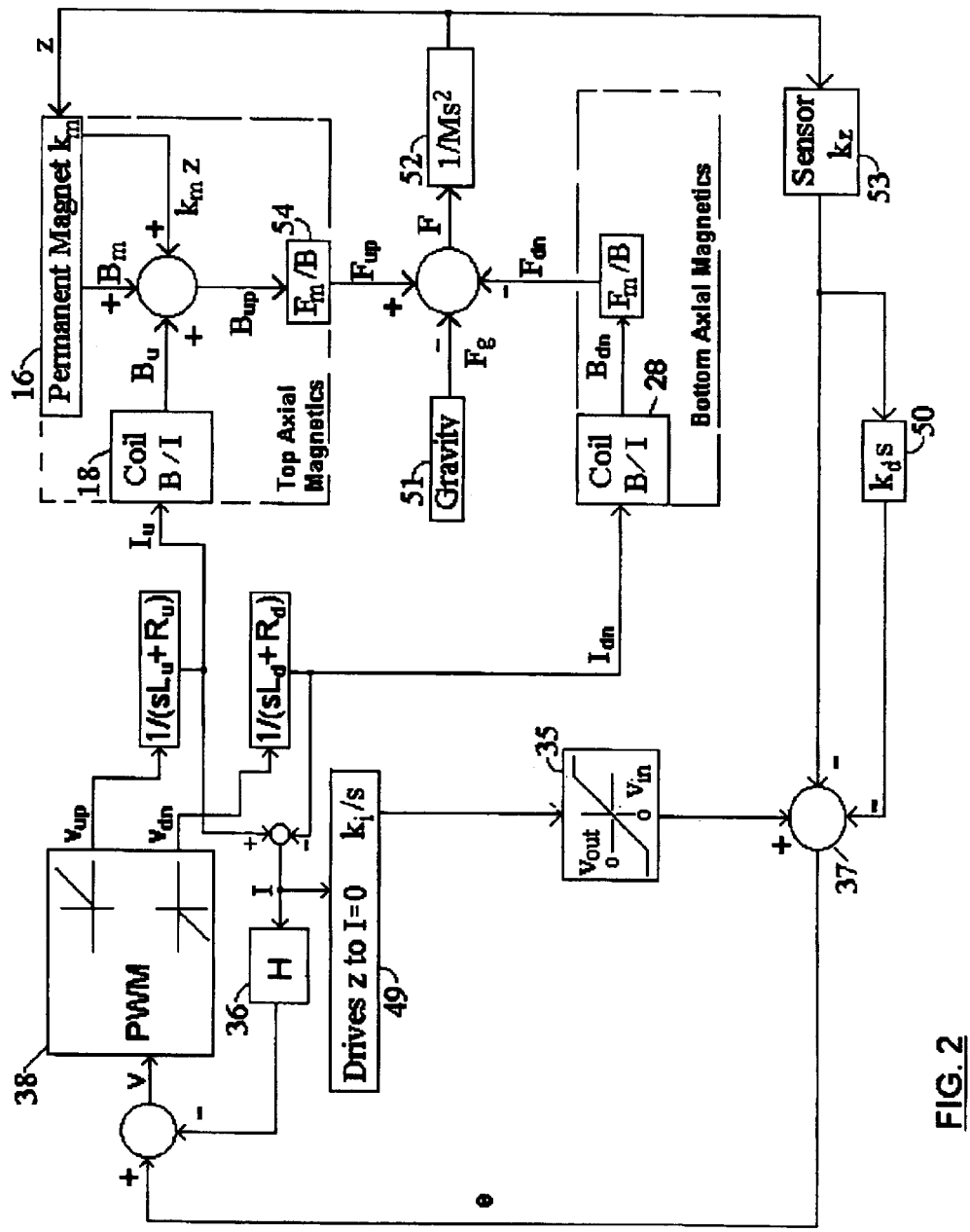
FIG. 2 illustrates a preferred embodiment of a servo loop to stabilize axial levitation, for a terrestrial flywheel system. This representation shows how the various system components relate to each other, and will be understood by control systems engineers.

The axial servo is shown in FIG. 2 as a block diagram. This servo stabilizes the axial levitation. It also adjusts rotor assembly height so current in opposing electromagnet coils is zero at steady state. These cooperative elements comprise the axial component of the contactless magnetic bearings of this more robust flywheel system. They also provide inherently stable centering forces, due to the same magnetic field that provides axial levitation. These relatively weak and undamped, but very important centering forces, are available at all times from the top axial magnetics. Producing these passive radial forces consumes no power. The pole shapes shown in FIG. 1 and in FIG. 11 maximize their passive centering forces.

This magnetic levitation configuration has features to achieve virtually zero hysteresis losses, because no iron, no high-permeability steel, and no magnets are subjected to magnetic flux cycling, nor to substantial magnetic flux variation, due to rotor spin.

Also, all magnetic paths are effectively closed by high permeability materials, except in the pole gaps (i.e., the vacuum) producing the required magnetic forces. This minimizes stray magnetic flux and maximizes required magnetic forces from permanent magnets and electromagnets. By using the full flux density capability of high-permeability steel, it also minimizes size and weight of steel poles in the axial magnetics of the present invention.

Figure 11:
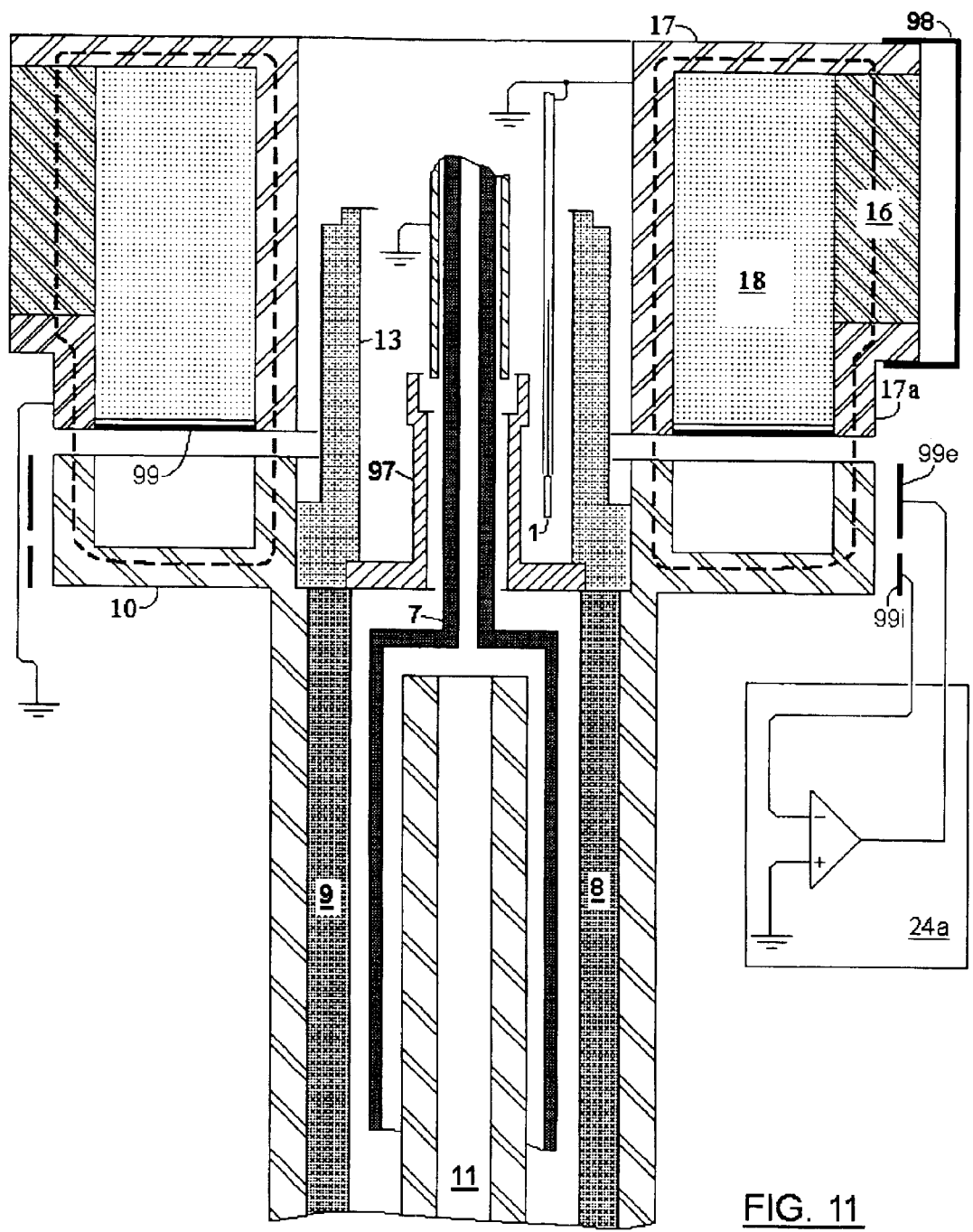
FIG. 11 illustrates a partial cross-sectional view through the spin-axis, to show the primary flux path of the axial levitation magnetics. It also shows Faraday shields, ground connections, magnetic field interceptors, and non-contact grounding methods, to suppress EMI.

The magnetic path of the axial levitation magnetics is illustrated by FIG. 11, a partial cross-sectional view in a plane through the spin axis. It has features to better accommodate a low-cost fixed ceramic magnet 16. In FIG. 11, the main flux path, for permanent-magnet 16 and current in coil 18, is denoted by the wide dashed lines through magnet 16, steel core 17, the inner pole gap, steel core 10, the outer gap, and steel core 17a. This path encircles coil 18 conductors.

Except for stray flux, magnetic flux density through 16, 17, 10 and 17a in FIG. 1, and shown by the thick dashed lines through 16, 17, 10, and 17a in FIG. 11, is inversely proportional to the respective cross-sectional areas of these materials. For example, if pole widths of 17 and 17a are equal, and if the diameter of 17a is double that of 17, then 17a will have an annular pole area approximately double that of 17. So flux density at 17 would be approximately double that at 17a. Likewise, if width of magnet 16 is double that at the pole of 17a, then flux density at the gap of 17a and 10 will be approximately double that at magnet 16. This is realized only with very small pole gaps, because stray flux increases considerably as pole gaps increase.

Magnet 16 is preferably a low-cost ceramic ferrite, having a flux density of 4000 gauss at zero oersted. Steel pole materials have arbitrarily high permeability at flux densities to 16000 gauss, each have widths (i.e., outer minus inner radius) approximately half that of the magnet, and, to facilitate this explanation, flux paths through the pole gaps are first considered to be infinitesimally short. Then distinct features of the axial levitation can be seen from this example:

Because magnetic forces of attraction are proportional to flux density squared, and to pole area, poles which concentrate flux into half as much area can approximately double the force of attraction between them. Flux density at 17a would be approximately 8000 gauss, for this example. And flux density at 17 would be 16000 gauss. So the axial force between 10 and 17 would be approximately double that between 10 and 17a. Force exerted between cooperating poles having a smaller diameter helps to reduce criticality of spin axis tilt control.

Relatively thin annular poles, between 10 and 17, having widths equal to the poles between 10 and 17a, enable a higher centering force gradient, for the inherently stable centering that they provide. With increasing distance between the fixed and rotatable poles, stray flux increases; and flux density in magnet 16 may decrease to 3000 gauss, with 5000 gauss in the gap between poles 17a and 10, and 9900 gauss in the poles between 17 and 10. Accordingly, levitation pole gaps will be small, consistent with dimensional and magnet property tolerances.

Pole 17a (along with the other cooperative steel poles) provides a pole face that can be very precise and have consistent high-permeability. So any chips, cracks, or defects of magnet 16 do not cause flux variation in the levitation pole materials or the magnet, due to rotor spin. Also pole 17a, after it is installed, protects magnet 16 from damage during subsequent assembly and test procedures. Ceramic ferrite magnets are low cost, but have relatively low strength. Chips and cracks are inevitable. Only their flat surfaces are normally ground and relatively precise, but may have cracks. With pole 17a in combination with pole 17, as shown in this invention, possible point-to-point variations in properties of magnet 16, and irregularities of its annular surfaces, will not degrade levitation performance or cause hysteresis or eddy losses.

A plurality of radial electromagnets are included at the top of the rotor spindle, represented by coil 20 and high-permeability steel core 21, to cause a centering force alternately opposed by a centering force due to current in a like coil 22. Each electromagnet is affixed to the flywheel enclosure, juxtaposed around annular rotor steel, to produce attracting radial centering forces as needed at the top of the rotor assembly. Servo control, for these electromagnets, is responsive to upper radial position sensors. A like configuration is positioned at the bottom of the rotor assembly. Together, these top and bottom radial electromagnets control radial centering.

A preferred embodiment of the present invention includes a set of 4 radial electromagnets at the top, and a set of 4 at the bottom. Electromagnets in each set of 4 are positioned 90° apart. At corresponding top and bottom positions, 4 radial position sensors, each sensor aligned with a corresponding electromagnet, provide radial servo position feedback. The sensors are also 90° apart. Each pair of diametrically opposite sensors provides radial position feedback for servo electronics controlling the corresponding electromagnet pair aligned with that sensor pair.

Figure 9:
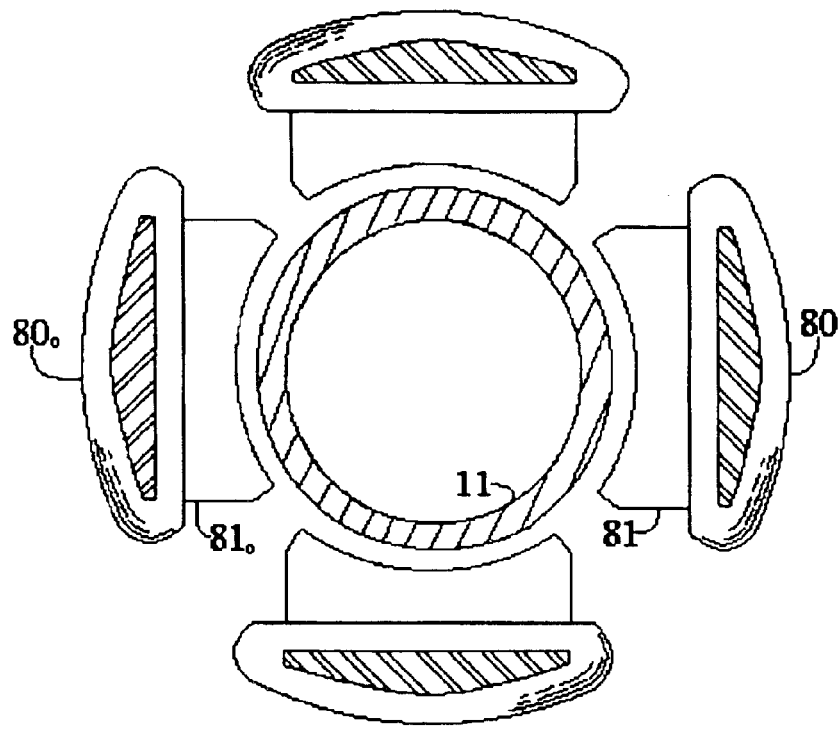
FIG. 9 illustrates an axial cross-sectional view through the lower radial electromagnets. It is designated PRIOR ART because it was set forth in U.S. Pat. No. 6,566,775.
Figure 10:
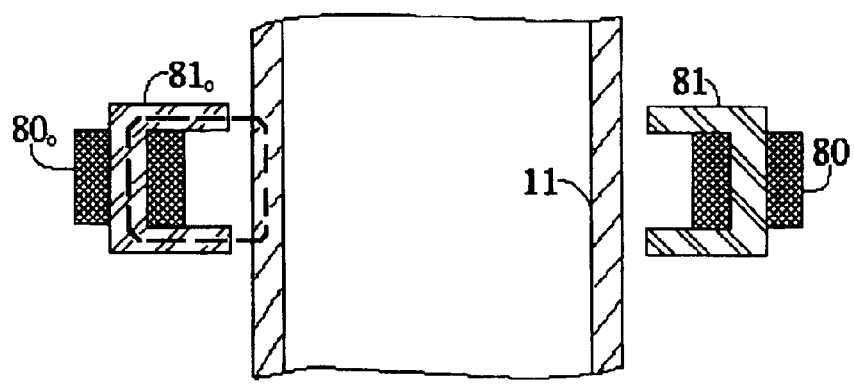
FIG. 10 illustrates a partial cross-sectional view in a plane through the spin-axis and through two lower radial electromagnets. It is designated PRIOR ART because it was set forth in U.S. Pat. No. 6,566,775.

A cross-sectional view of the radial electromagnets, in a plane through the spin axis, is illustrated in FIG. 1. Electromagnet coil 22 is shown there at the left and 20 at the right (with its steel core 21). An identical set of electromagnets, to produce controlled radial forces at the bottom of the rotor assembly, is represented by electromagnet coil 80 and steel core 81 affixed to the enclosure. They produce attracting radial centering force, with juxtaposed cylindrical rotor steel. A cross-sectional view, in a plane perpendicular to the spin axis and through the center of these lower radial electromagnets, is illustrated in FIG. 9. The opposing electromagnets are shown as coil $80_o$ and steel core $81_o$. The cylindrical rotor steel is shown there as 11. A partial cross-sectional view through the spin-axis is illustrated in FIG. 10, which also illustrates the main flux path through the poles $81_o$ of the radial electromagnet and juxtaposed rotor steel 11.

The flux path is shown as a wide dashed line, which loops through electromagnet core $81_o$ and rotor steel 11. Servo control, for the two diametrically opposed radial electromagnets shown, is responsive to lower radial position sensors represented by signal lead 3 shown in FIG. 1.

The upper and lower groups of radial electromagnets provide radial vibration damping and radial position stiffening, to limit rotor assembly nutation and swirling, and to dampen radial vibration due to production tolerance eccentricities at resonant frequencies. They also limit radial excursions at spin rates too low for effective gyroscopic stabilization of the spin axis, and constrain relative radial motion between rotating and fixed elements during possible earthquakes.

In FIG. 1, radial electromagnet core 21 is affixed to the enclosure by supporting member 29. Radial electromagnet iron 81 is likewise affixed to the enclosure by supporting member 19.

Practitioners of this art will recognize that the radial electromagnets described above, to exert force, require power to drive their respective coils, and that they subject their cooperating cylindrical high-permeability rotor steel to magnetic cycling when the rotor spins.

Each of the two rotor sections (one at the top and one at the bottom of the rotor assembly) are subjected to flux density that cycles between zero and the maximums needed to produce radial forces required to maintain prescribed radial position. In FIG. 10, the magnetic flux, moving relative to rotor steel 11 as it spins, would cause both hysteresis and eddy losses. The eddy loss component is reduced in some prior art, by using laminated steel, which blocks some eddy currents that accompany magnetic flux cycling. Constructing these rotor sections from steel laminations is not practical, nor is it needed, for the present invention. Laminated radial electromagnet cores are feasible, but not essential, because their associated coils are usually not active. Steady-state hysteresis and eddy loss is negligible for the following several reasons: The vertical flywheel spin axis of this invention does not require radial forces to support the flywheel against radial gravitational forces, as do flywheels with horizontal spin axes. During normal operation, passive centering forces from the axial magnetics maintains centering within the radial servo deadband. In most prior art, flywheels having horizontal spin axes are supported by a combination of permanent magnets and stabilizing electromagnets, with opposite magnetic poles orientated around a cylindrical steel rotor section, so its laminated rings can reduce eddy loss in the steel. They differ 90° from the poles of the present invention shown in FIG. 9 and FIG. 10. Radial electromagnets and cooperating rotor steel, of that prior art, incur continuous losses, to levitate horizontal-axis spinning rotors. So most prior art configurations incur continuous high losses, even with laminated steel. Also, the radial electromagnets' moving magnetic path, on rotor sections of that prior art, is essential radially inward, to circumferential, to radially outward, completing a closed magnetic path. Radial paths in the rotor, of that prior art, incur continuous magnetic cycling between plus and minus the maximum flux levels required to produce forces to support the spinning flywheel weight. So at equivalent force levels to those produced by radial electromagnets of the present invention, such prior art incurs hysteresis losses in spinning rotor steel, double or more the maximum hysteresis losses sustained by the rotor steel of the present invention. Higher but only temporary eddy loss, in its rotor steel and radial electromagnet cores, are incurred, according to the present invention.

Moreover, servos controlling the radial electromagnets of the present invention have a prescribed zero-crossover deadband, so they will not produce restoring forces unless radial speed or displacement exceeds threshold levels. During steady-state operation, centering is maintained by passive axial magnetics. Therefore, the radial electromagnets are energized only rarely, and remain inactive during normal operation. Average power to drive them, and consequent magnetic hysteresis and eddy losses, are thus virtually zero.

The vertical spin-axis and improved method of rotor levitation, stabilization, and stiffening of its axial and radial position, provided by this invention, will have the following described additional benefits over the prior art:

Axial levitation provides lift force only at the top of the rotor assembly. That lift force, combined with downward gravitational forces on a rotor assembly having a low center-of-gravity, produces a leveling torque that can maintain spin-axis verticality within one degree or so, relative to level non-rotating elements of the flywheel. This leveling torque counteracts precession torque due to earth rotation. A low center-of-gravity is needed, because even a few degrees of tilt will cause magnetic fluctuation and resulting hysteresis losses in the annular materials of the axial levitation magnetics.

The rotor assembly, spinning at very low speed, may tilt, wobble, and nutate, due to even slightly unbalanced rotor assembly mass distribution and gyrodynamics, under dynamic axial and radial servo forces. Small diameter axial lift magnetic poles, and a rotor assembly having a low center of gravity, alleviate such tilt. The radial electromagnets constrain it as needed.

At low spin speed, the radial electromagnets may need to occasionally exert radial forces, to maintain spin-axis centering and verticality within a selected dead-band tolerance of the servos controlling them. However, at spin speeds above about 10% or so of maximum, gyroscopic and inertial effects will stabilize the flywheel against spin-axis wobble, nutation, and swirling. So the radial electromagnets are needed to control spin axis verticality at very low spin speeds, such as during rare power-up and power-down, but need not be energized during normal operation.

Flywheel spin speed at 10% of maximum corresponds to 1% of maximum energy storage. However, at 10% of full speed, back-EMF is 10% of maximum; and mainly due to current limits of the power electronics, charging and discharging power is limited to 10% of the power at full speed, unless rated maximum current is 10 times higher. This would require more expensive power electronics, and would reduce motor/generator efficiency considerably at low spin speeds. So the preferred embodiment will operate between about 40% and 100% of maximum speed, corresponding to about 20% and 100% of full energy capacity. With lower speed restricted to 40% of maximum, power electronics can be rated to conduct current with a conservative design margin at 40% of maximum speed. The flywheel could be oversized about 20% to provide full rated energy output when it is decelerated from maximum speed to 40% of maximum speed.

A mechanical backup bearing at the top of the rotor spindle, and another at the bottom, engaged by contact at beveled backup bearing touchdown surfaces with mating contact surfaces on the rotor assembly, will be engaged during flywheel battery storage, transit, and installation procedures. Beveled surfaces restrict both axial and radial excursions when engaged.

Figure 14:
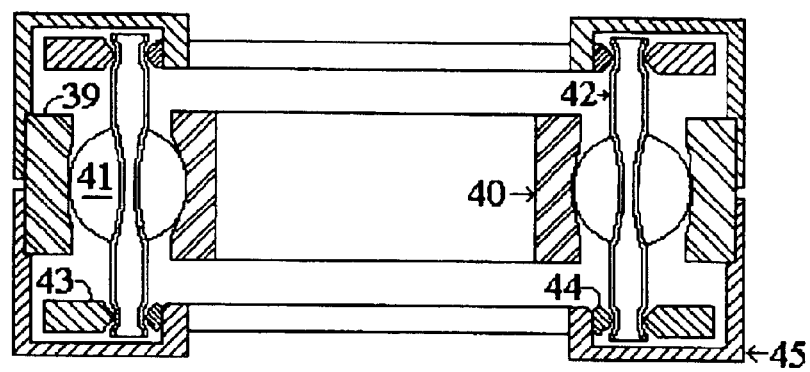
FIG. 14 illustrates a cross-sectional view in a plane through the spin axis, of a rolling contact mechanical backup bearing, according to the present invention.
Figure 15:
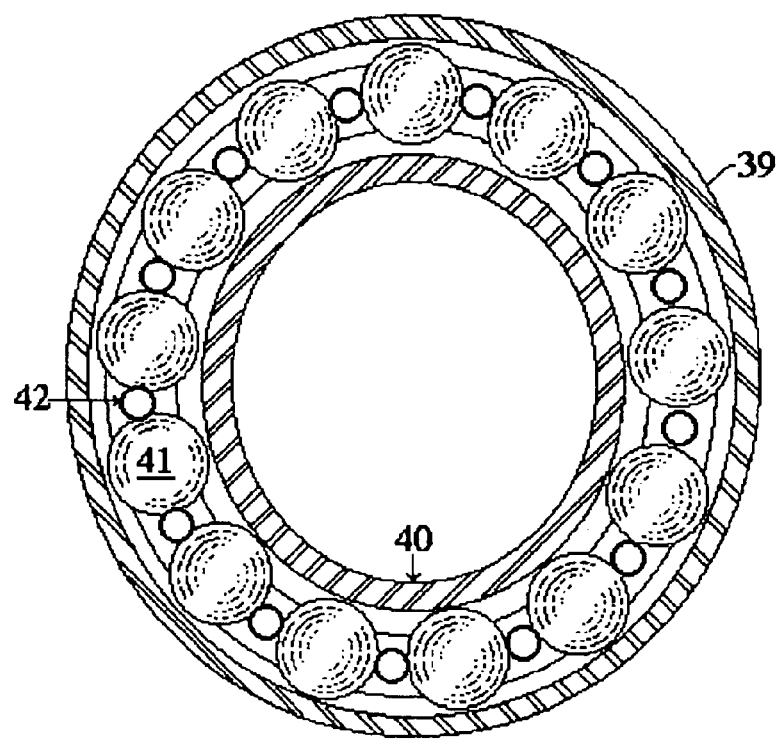

Backup bearings may be engaged and disengaged by jackscrew mechanism 27, shown in FIG. 1. Mechanical support would normally be disengaged after electric power is connected, by driving motor 26 as commanded by a power-up algorithm. Motor 26 would normally be driven in an opposite direction, to engage mechanical support, as the last command in a sequence, of a power-down algorithm. Internal flywheel damage can be mitigated, in the event that electronic control of the magnetic bearings is lost (possibly due to accidental in-service disconnection or electronic component failure) and the power-down algorithm cannot be executed. Then, to mechanically constrain the rotor assembly, so sensitive parts do not collide, spacing between the mechanical backup surfaces after disengagement must be smaller than spacing between the sensitive parts. Rolling contact mechanical bearings, as illustrated in FIG. 14 and FIG. 15, can help to survive mechanical engagement at higher spin speeds, than mechanical backup bearings having sliding surfaces with no lubrication.

The two axial electromagnets, included in the present invention, may at first seem more costly than the single electromagnet included in U.S. Pat. No. 6,566,775. But total cost should be comparable or less: That is because each coil driver of the present invention can be implemented with only one transistor, compared to the four required by an H-bridge to provide bi-directional coil current. This is illustrated by Q1 to drive coil 18 and Q2 to drive coil 28 in the preliminary circuit schematic FIG. 2A. Moreover, only one motor 26 in FIG. 1 is needed, because the rotor assembly can be moved downward from force provided by the bottom electromagnet coil 28 in FIG. 1 after mechanical constraints are disengaged. In early prototypes that will not be subjected to significant shock and vibration, and especially not to dropping these prototypes, motor 26 and jackscrew assembly 27 can be omitted. Magnetic force from magnet 16 can support nominally 2 or 3 times the rotor assembly weight, when it is idle at its extreme upper position.

Ratio of rotor length to diameter in the present invention is preferably higher than the proportions illustrated in FIG. 1, for various reasons. For example: The ratio of active to return wire in the motor/generator can be higher, for greater power conversion efficiency. Signal disturbance to position sensors, from permanent magnets and actuator coils, can be reduced by increasing distance between them. A lower center-of-gravity helps to stabilize verticality of the spin axis. Eddy current bucking and blocking methods set forth herein are also facilitated.

In FIG. 1, part sizes are proportioned so that essential components in the flywheel enclosure are therein visible, and so that adequate space is available for numbered component designators. So, to facilitate a clear description of this invention, parts are not necessarily drawn to accurate scale. For example, inner rotor steel cylinder 11, to resist bending (due to mass eccentricity relative to the spin axis) at high spin speed, preferably has larger inside and outside diameters, compared to proportions in FIG. 1. This reduces stress at its shoulder, where it is attached to annular rotor steel 10, and reduces its flux density. Stator 7, rotor magnets 8 and 9, and outer steel cylinder 10, also have preferably larger diameters, to accommodate a larger diameter inner rotor cylinder 11. But the upper levitation poles of 10 would not have larger diameters, so they can withstand centrifugal forces at high spin speed, and can better accommodate tilt.

Prior art motor/generator features, which are not compromised to achieve the more robust present invention, are summarized below by way of reference to FIG. 3, FIG. 3a, FIG. 4, and FIG. 4a as set forth in U.S. Pat. No. 6,566,775.

Figure 3:
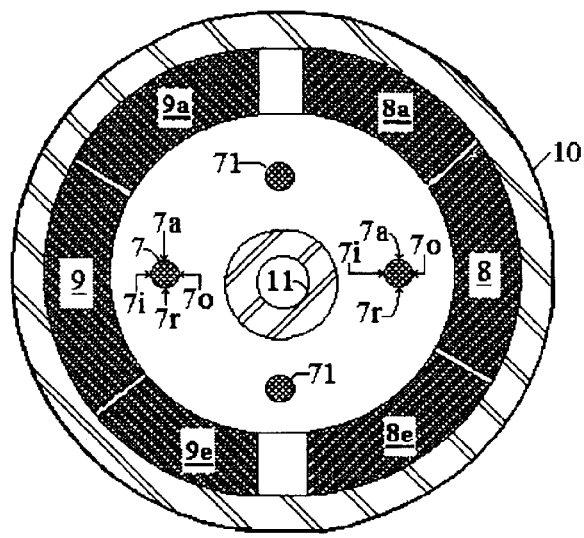
FIG. 3 illustrates an axial cross-sectional view of the motor/generator. It is designated PRIOR ART because it was set forth in U.S. Pat. No. 6,566,775.
Figure 4A:
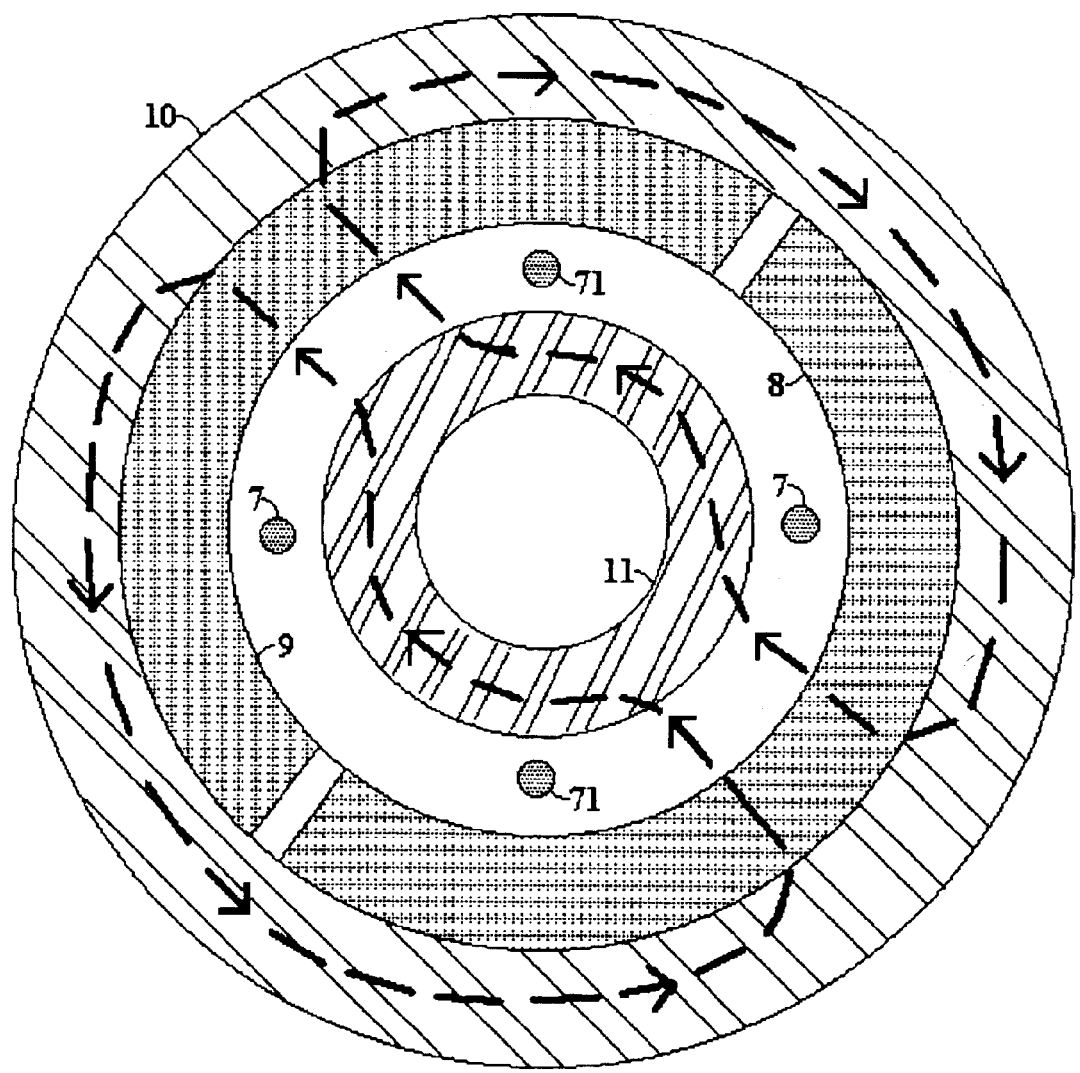
FIG. 4a illustrates main paths for the magnetic field of the motor/generator. It is designated PRIOR ART because it was set forth in U.S. Pat. No. 6,566,775.

FIG. 3 and FIG. 4a show axial views of cross-sections of a 2-pole 2-phase embodiment of the radial-field motor/generator included in the present invention. Stator winding 7 is shown in these views, in fixed relation to the second phase winding 71. For this 2-phase embodiment of the invention, shown by way of example, winding 71 is positioned 90° from winding 7.

A 4-phase embodiment of the motor/generator would have 2 additional stator windings, displaced 45° from windings 7 and 71. Rotor angle signals and corresponding current control electronics, plus connection between them, for two additional phases, would need to be added. A straightforward addition of two more sensors, corresponding electronics, and cabling, would also be needed, or additional feedback signals can be derived by combination, as explained next:

If the minimum two angle sensors (represented by 1 in FIG. 1) provide good sinusoidal vs. rotor angle approximations, sinusoidal signals vs. rotor angle for additional phases can be derived. For example, rotor angle signals needed for the preferred 4-phase embodiment are respective sum and difference of the first two signals scaled by 70.7% (i.e., multiplied by 0.707). For a 3-phase embodiment, the two sensors represented by signal lead 1 need to be disposed 120° apart. The third phase angle signal would then be the negative value of their sum.

Having only 2 poles, but 3 or more phases, would reduce eddy loss in the stator windings, in comparison to maximum motor/generator power; because it results in a smaller flux density gradient over the width of the stator windings. More phases permits smaller diameter stator windings, for the same power handling capability, due to fuller use of stator space. That results in more efficient phasor addition of back-EMF and torque from multi-tun windings (which would span a smaller rotor angle), and relatively less eddy losses. These benefits will be explained by the simplified analysis of eddy losses, by way of example, below:

Currents through these respective windings, and back-EMF across their terminals, have approximately sinusoidal waveforms having 90° relative time phases. Permanent magnets 8 and 9 have radial fields, one with inward polarity and the other outward. In one embodiment, these magnets are tapered symmetrically along their axial direction so their axial dimensions are less at their nearest approach to each other and maximum at their centers. In another, shown in FIG. 3, magnets 8 and 9 are preferably neodymium-iron-boron, and magnets 8a and 8e, along with 9a and 9e, are preferably ceramic ferrites. The ferrites support about half the flux density and have the same thickness. This 2-pole embodiment subjects stator windings 7 and 71 in FIG. 3 to lower field gradients than rotors having more poles.

Both flux shaping methods described above result in magnetic flux, at the stator 7 and at the rotation sensor 1, that closely approximates a sinusoid, as a function of rotation angle. The resulting magnetic field follows symmetric closed paths through the magnets, the stator winding region, inner high-permeability cylinder 11, and outer high-permeability cylinder 10.

All elements shown in FIG. 3, except the stator windings, are part of the motor/generator rotor. When the rotor spins, for a moment when it is at the position illustrated, momentary back-EMF across terminals 7c and 7e of winding 7 (shown in FIG. 4) is at a maximum, while back-EMF across the terminals of winding 71 is at zero. The magnetic field from the rotor magnets rotates with the rotor. Its main paths, through the rotor and stator, are shown by wide dashed lines in a cross-sectional view perpendicular to the spin-axis, illustrated by FIG. 4a.

This type of motor, known in the art as a coreless DC permanent-magnet motor, is characterized by two significant differences from conventional salient-pole motors:

Its stator windings have very low inductance. This requires series inductors 31 and 32, shown in FIG. 4, to facilitate PWM stator current control. Preferably, they have ferrite cores which incur relatively low core loss at a relatively high PWM switching frequency.

H-bridge 34, shown in FIG. 4, can provide drive current control at one polarity by switching Q1 at a PWM frequency generally below 100 kHz while Q3 is ON. And it can provide drive current control at the opposite polarity by switching Q2 at PWM frequency while Q4 is ON. Diode D4 provides free-wheeling in the first case, and D3 in the second. This motor drive operating mode accelerates the flywheel, to store energy. One problem with this described switching sequence occurs when current and voltage approach zero cross-over. At higher electrical frequencies (i.e., higher spin speeds) current decrease may lag voltage decrease, because Q3 and Q4 remain ON and allow current to free-wheel, at nearly zero voltage across the left sides of inductors 31 and 32. That results in current lag and current distortion.

Prior art PWM switching, that prevents this lagging current, drives Q1 and Q3 ON and OFF simultaneously, then Q2 and Q4, and so on. But this PWM switching schedule has higher losses because: Current through DC power buss terminals 4 and 5 reverses each time the power transistors are switched OFF, so peak currents must be higher for the same effective current to the motor. Also, essentially square-wave variable duty-cycle voltage at PWM frequency, across inductors 31 and 32, are double that of the other switching schedule. So inductor core loss is about four times as high. And transistor PWM switching transition losses are double, because they occur also in Q3 and Q4 (not just in Q1 and Q2).

Figure 6:
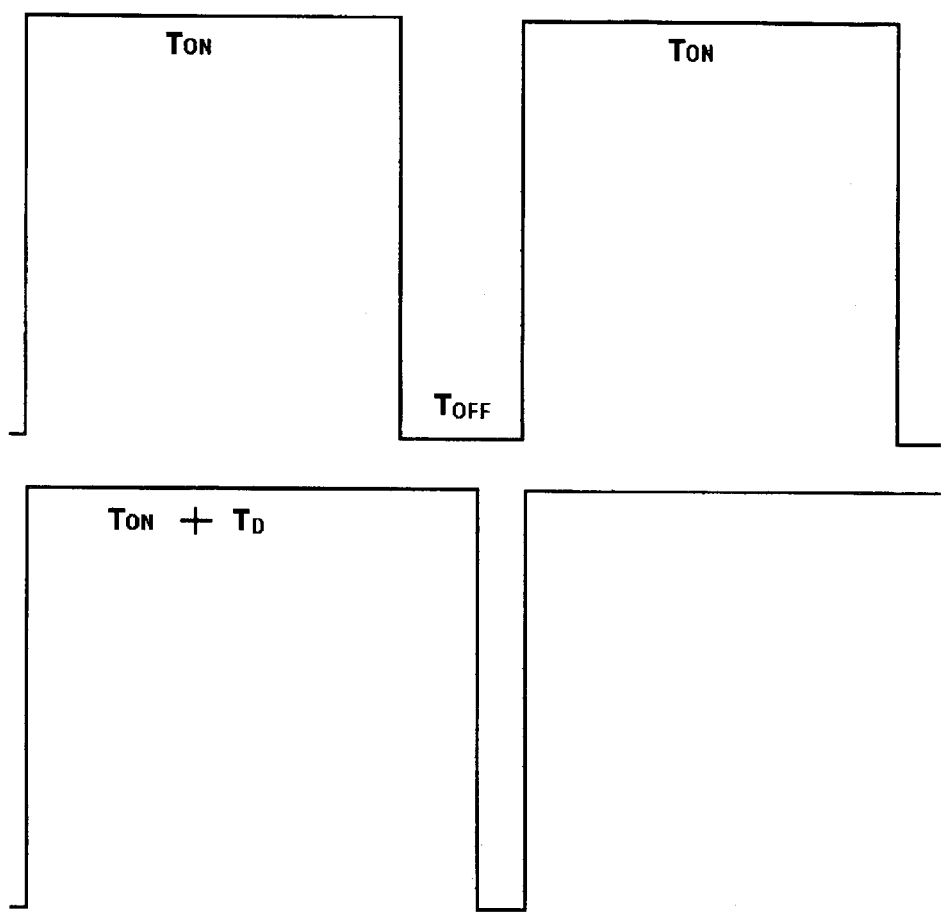
FIG. 6 illustrates PWM current control timing, for a diagonal pair of switches in one of several H-bridges in the power interface electronics, during drive mode.

The present invention provides a PWM switching schedule wherein one transistor of each diagonal pair has slight PWM turn-off delay $T_D$. That practical and simple turnoff delay provides the best features of each prior art method. A preferred embodiment of this switching schedule is illustrated in FIG. 6; wherein the upper square-wave represents the PWM ON times $T_{ON}$ and OFF times $T_{OFF}$ of Q1 and alternatively Q2, and the lower square-wave represents the ON times $T_{ON}+T_D$ of Q3 and alternatively Q4. Whenever duty cycle $T_{ON}/(T_{ON}+T_{OFF})$ is relatively high, $T_{ON}+T_D$ will exceed $T_{ON}+T_{OFF}$, so Q3 and alternatively Q4 will remain ON, as in the first method of the prior art. Conversely, whenever duty-cycle is low, as when current and voltage approach a zero crossover, Q3 and alternatively Q4 will turn off at PWM cycles as zero crossover is approached, to force current in phase with voltage.

This improvement may lower power electronics losses, while driving the motor, from an existing 5% loss, to about 3% or 4% loss, compared to the second prior art method. Since power electronics losses of this invention are typically higher than other losses, that improvement is significant. And this improvement does not incur the current lag and distortion of the first prior art method of PWM motor drive control described above. In this mode, H-bridge 34 serves as a buck regulator and commutator when driving the regenerative motor, for controlling bi-directional sinusoidal stator current.

When electric power is required from the flywheel battery, H-bridge 34 in FIG. 4 controls regenerative braking current by switching Q4 at PWM frequency for one back-EMF polarity, and Q3 for the opposite. D1 injects current from node 5 into node 4, from current pulses smoothed by capacitor C, while D3 free-wheels for the first back-EMF polarity, D2 and D4 for the opposite back-EMF polarity. This operating mode is called boost regulation. It decelerates the flywheel, to recover electric power. Power switches Q1, Q2, Q3, and Q4 are preferably semiconductors with good switching characteristics, such as MOSFETs or IGBTs. Diodes D1, D2, D3, and D4 are preferably fast-recovery soft-turnoff rectifiers. MOSFETs have intrinsic diodes; some have adequate reverse recovery attributes to be used for this free-wheeling clamp and rectifier function. Capacitor C has low loss for high-frequency current. It stores and supplies PWM current pulses. It is preferably a multi-layer ceramic or metalized-film type.

PWM driver 33 controls H-bridge 34. It is responsive to various input commands, including the feedback signals from the rotor angle sensors. Flywheel rotational speed increase can be inhibited by a vibration discriminator command responsive to signals in the axial and radial servos. That command would inhibit motor drive after processing to determine if axial or radial excursions or rate persist beyond a prescribed time. DC buss voltage across terminals 4 and 5 can be regulated as needed by negative voltage feedback from the buss.

Although it requires added inductors, this type of motor/generator facilitates use of ferrite inductor cores having far lower losses in inductors essential to PWM current control. In the prior art that uses salient-pole laminated-iron-core motor/generators, much higher motor core loss is sustained under PWM drive. Also, with that prior art, permanent magnets from a spinning rotor magnetically cycle the stator iron, causing high idling loss due to magnetic hysteresis. In a vacuum enclosure, these losses cause heating, which is not easily transferred away from hot components of a flywheel assembly. Also, most inner rotor permanent magnets of the prior art require high-strength annular bands around them, to prevent their disintegration from centrifugal forces. These bands increase gap length and decrease radial clearance between the rotor and stator. They also incur high production cost and have lower power conversion efficiency.

Unlike conventional stator windings in core slots, with uniform magnetic fields in the core slots, so that each conductor reacts with the same flux, the motor/generator of this invention has a magnetic field which is not uniform at the stator windings. This property of all coreless motors has caused high eddy losses in the prior art, as explained below:

If solid magnet wire stator windings are used, they are subjected to magnetic fields that are not uniform over their relatively large cross-sections. This is illustrated in FIG. 3 by points 7a and 7r, which are in a magnetic field having a sinusoidal variation with angle (summed over active winding length) around the spin axis that sweeps by these points. It is also illustrated by points 7i and 7o, which are in a magnetic field that is not radially uniform.

Figure 3A:
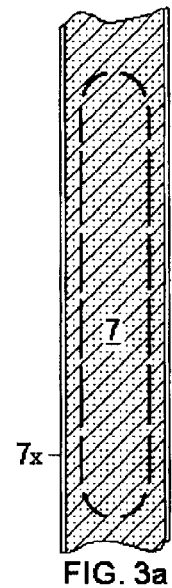
FIG. 3a illustrates an enlarged cross-sectional view of a stator conductor segment, to show a typical eddy current path in the conductor. It is also PRIOR ART, shown in U.S. Pat. No. 6,566,775.

Differences in axial EMF induced at 7a and 7r, and 7i and 7o, are thus responsible for eddy currents flowing in concentric eddy loops along the entire two rotor lengths of winding 7 in the rotating magnetic field produced by a spinning rotor. The wide dashed line in FIG. 3a illustrates the eddy current path in a representative segment of stator conductor 7. Insulation 7x is shown at each side of this cross-sectional view. The eddy currents do not produce useful power or energy conversion, because they do not exert net torque, and do not produce back-EMF across the stator terminals. They also dissipate energy and cause heating in the stator windings.

Eddy loss in winding 71, at the moment of relative rotor position shown in FIG. 3, is considerably higher than in winding 7, because field gradient is maximum when crossing through zero (i.e., between the magnets).

Stranded magnet wire can reduce eddy loss substantially. By way of explanation, if points 7a and 7r, and 7i and 7o, represent cross-sections of very small diameter copper wire strands, each individually insulated from the others by an insulating coating, localized eddy current is prevented unless it flows through the respective winding terminals 7c and 7e where the strands connect. Insulation around each strand blocks eddy currents that would otherwise circulate within a large diameter conductor in the rotor field.

For a stator winding wherein individual insulated strands are not spiraled, and straight active conductors are disposed as shown in FIG. 3, EMF generated along a rotor length of strand 7a on one side of the spin-axis will ideally equal the EMF generated across strand 7r on the other side. And if, at the bottom of the stator (in the inactive winding segment between the two straight active segments in the rotor field) each strand is interchanged radially about the center of the group, so that 7i and 7o appear as shown at each side of the spin-axis, the sums of different incremental EMFs generated over the length of each strand will be equal across 7c and 7e. Minimizing loss due to current circulating between conductor strands, with these straight active conductors, requires experimentation and consistent detailed wire-forming procedures.

This example of eddy bucking (i.e., EMF equalizing over the length of each strand, to prevent current flow through one strand that circulates through any another, and thus circulating in an equivalent eddy manner through the group of strands) is predicated on symmetric and opposite radial magnetic field strength along a plane passing through the spin axis. Insofar as a part of the sinusoidal flux varies almost linearly across the bundle of strands, the summed EMFs presented at the winding terminals 7c and 7e, of each individual strand, disposed in between those shown (7a, 7r, 7i and 7o), are also equal.

Ideally, effective blocking and bucking (by terminal-to-terminal incremental EMF summing that cancels total back-EMF differences along each strand's total length) can be achieved by equalizing the differences that would otherwise cause eddy currents and their power dissipation.

In production wire forming procedures, maintaining the relative positions of each strand, as set forth herein, requires very specialized tooling. Stranded wire is intentionally spiraled to improve forming qualities, like bending compliance and ability to keep strands in a group. If a slight amount of spiral is not well defined, strand positions may inadvertently be interchanged when formed, from one side to the other. This could cause eddy current losses in stranded conductors, that is comparable to that of eddy loss in solid large-diameter windings.

An easier method to buck and block eddy currents, and yet have the benefits of more compliant forming quality inherent in spiraled stranded wire, is to use a spiral pitch wherein the EMF sum of each strand is equalized over many segments within the stator winding length. This method is consistent with the long spindle length set forth herein, to achieve other benefits described above. However, with close spiral twisting, each strand is longer, and consequently has higher resistance. But production costs may be far less than the parallel strand example, whose benefit from shorter conductor length may be overshadowed by forming difficulty. The examples used here explain, with a sequence of winding options, the principles involved.

Spiraled, insulated-strand stator windings are a preferred embodiment of this invention, which can provide eddy current blocking and bucking. The essentially straight and complicated, insulated-strand windings, formed as set forth hereabove, are an alternate embodiment.

Litz wire also achieves eddy loss reduction. But it is far more expensive than insulated-strand magnet wire, and is bulkier for the same terminal-to-terminal resistance. Insulated-strand copper wire, commonly known as magnet wire, is less expensive, takes less space, and so makes better use of rotor magnets. Litz wire was developed to reduce losses from high-frequency skin effect, wherein required current through the conductor flows mainly along the surface of large diameter conductors, due to more high-frequency inductive coupling near the center. Effective area of large diameter conductors is thereby reduced, thus increasing effective resistance and losses.

Eddy loss has commonly been confused with skin effect in the prior coreless motor art, particularly when used in flywheel batteries, where idling loss is so detrimental. But idling loss is surely not caused by skin effect, mainly because skin effect restricts effective (i.e., required) high-frequency current through conductors. Clearly, required stator current ideally is zero during motor idling, so skin effect does not cause idling loss.

Skin effect may lower motor/generator power conversion efficiency a very small-amount:

A 2-pole rotor spinning at 100,000 rpm which has required stator current at an electrical frequency of 1667 cycles per second, will conduct most of the current through its skin depth of 0.064 inch. That means that even a 0.125 inch diameter copper conductor will be able to conduct current through most of its cross-sectional area. Litz wire may utilize its small diameter strands a bit more, but their total area will be less, and length will be more, than solid or stranded wire. So Litz wire in flywheel battery motor/generators can reduce eddy loss, but will generally have more resistance to stator current, compared to the individually insulated multi-strand conductors set forth herein and in U.S. Pat. No. 6,566,775.

Basic equations defining operation of the 2-phase 2-pole motor/generator as set forth in the present invention are, for one stator phase:

Back-EMF (volts)=$0.67 \times 10^{-8} \times$ {number turns per phase}×{stator diameter (inches)}×{field strength (gauss)}×{stator height (inches)}×{rotor rpm}×{sin(rotor angle)}.

Torque (inch pounds)=$56 \times 10^{-8} \times$ {number turns per phase}×{stator diameter (inches)}×{field strength (gauss)}×{stator height (inches)}×{peak current (amperes)}×{$\sin^2$(rotor angle)}.

For the other phase, sine terms are replaced by cosine. So the sum of torque from the two phases is proportional to $\sin^2$ (rotor angle)+$\cos^2$ (rotor angle) which will have negligible ripple with reasonably good sinusoidal rotor field distribution. The PWM power electronics sums current through the two phases in accordance with the same relationship, and thereby exchanges current with the DC power buss, which likewise has negligible ripple. All polyphase sinusoidal machine configurations perform this type of complementary summing, albeit with more terms than this simpler 2-phase example.

A preferred embodiment of the axial levitation servo loop is shown in conventional block diagram form, by FIG. 2, a representation well known in the feedback control system art.

Block 35 denotes gain with limiting (in this case, to limit the adjustment range of integrator 49) and a small dead-band (to reduce excessive response to very small perturbations), 36 denotes feedback gain, and 37 denotes a summing operation wherever shown here. Block 38 represents the transfer function for a pair of opposing PWM drives. They provide average respective voltages $V_{up}$ and $V_{dn}$ to coil 18 and opposing force coil 28. Coils 18 and 28 are physically shown in cross-section in FIG. 1. $L_U$ represents upper coil 18 inductance and $R_U$ its resistance. $L_d$ represents lower coil 28 inductance and $R_d$ its resistance. Wherever shown here in a transfer function, s denotes the Laplace operator. Block 36 provides current feedback gain to shorten time lag to upward and downward electromagnet force production, due to inductances $L_U$ and $L_d$.

In FIG. 2, transfer function $k_m$, which varies as a complex function of rotor assembly axial position z, also depends on properties of annular, axially-magnetized, permanent-magnet 16, which is physically illustrated in FIG. 1 and FIG. 11. Rate feedback 50 is denoted by transfer function $K_d s$, and is derived from the axial position sensor 53 denoted by its incremental axial motion sensitivity $k_z$. Rate feedback is included for damped dynamic response.

Force from gravity 51, on the rotor assembly, is proportional to its weight 52 denoted by its mass M. Block 49 denotes integrator transfer function $k_1 s$. It integrates a signal representing the difference of currents in coil 18 and coil 28. Its output slowly drives the feedback loop until the rotor assembly is axially positioned where axial force due to the magnetic field from permanent magnet 16, with current in coil 18 and coil 28 both equal to zero, is equal to the rotor assembly weight. Block 49 output is preferably limited intrinsically (shown by 35) so it adjusts axial position only enough to accommodate magnet property tolerances, and is capable of both positive and negative axial position adjustment. Maximum output from 35 is less than the maximum output from 53, so that position feedback always determines nominal axial position, with the integrator only adjusting it within prescribed limits. Integration can be implemented by analog circuits, or by an up/down counter, depending mainly on production quantity.

Although the servo block diagram shown in FIG. 2 includes semi-proportional elements, an integrator, and derivative functions, it is very different from prior art PID (Proportional-Integral-Derivative) servo loops, which are familiar to feedback control engineers. Those prior art PID servo loops include error integrators, to achieve zero error. Simply stated, the integrators of such PID loops have negative loop feedback, and they increase drive to loop elements driven by their output relatively slowly, until the integrator input (i.e., error) is driven to zero.

Conversely, integrator 49 has positive loop feedback, and increases drive (that adjusts rotor assembly axial position) relatively slowly, until coil currents are driven to zero.

Dynamic analysis computer programs can accurately determine stability and response of this servo loop. They can help greatly to optimize it; in combination with a finite element analysis program to accurately characterize magnetostatic fields and forces of elements shown within the dashed rectangles labeled "Top Axial Magnetics" and "Bottom Axial Magnetics" in FIG. 2.

For example, physical dimensions and properties of coil 18, in juxtaposition with permanent magnet 16 and related annular magnetic materials, would be entered, to determine flux densities B in magnetic circuits, and how axial force $F_m$ varies with incremental position z for a given nominal position. That would be repeated for coil 28 and its magnetic circuit. This is then entered into the dynamics analysis to test responsiveness and stability at various positions.

Figure 2A:
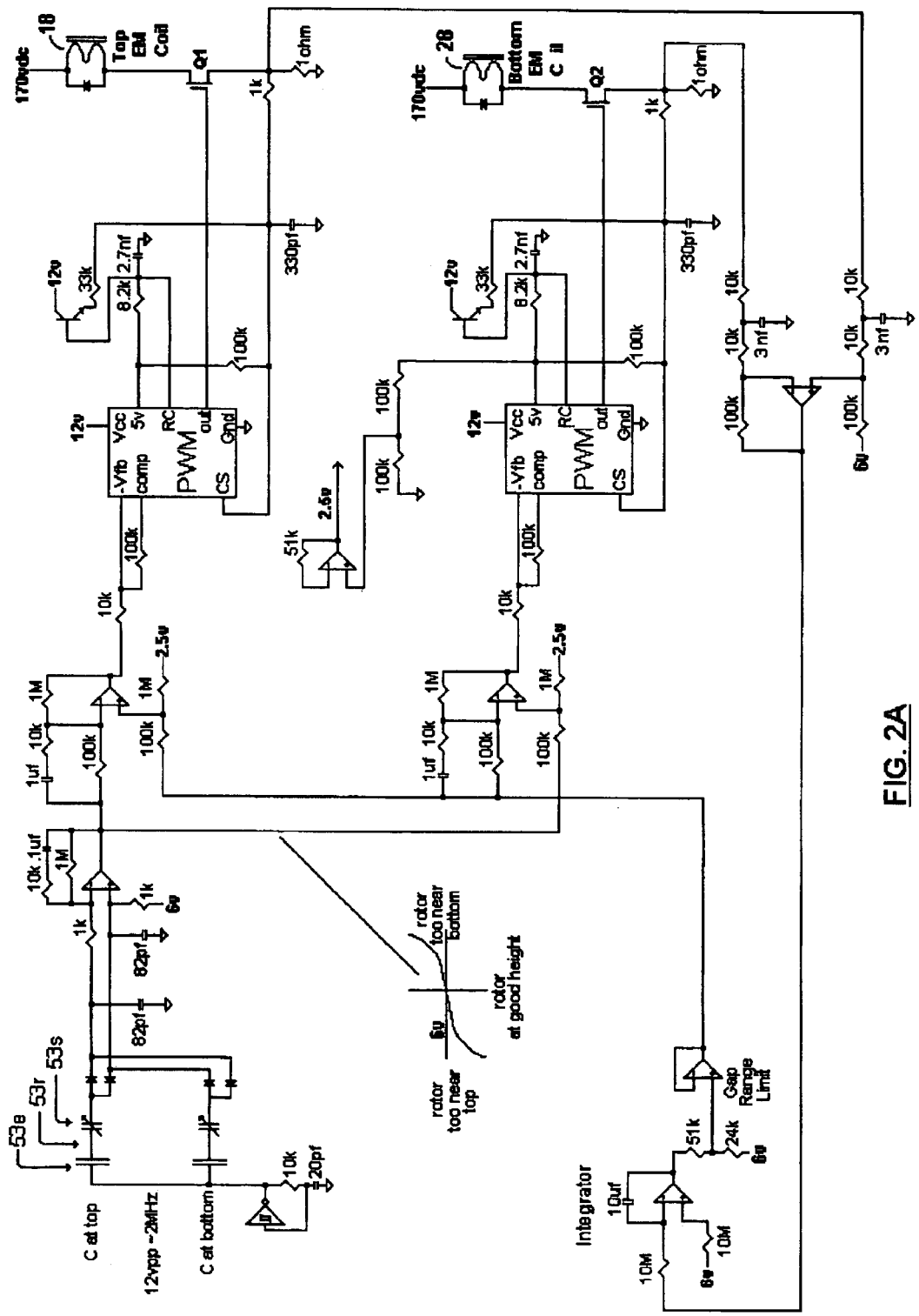
FIG. 2A illustrates a simplified circuit schematic of the axial servo electronics. Representative component values are shown, to facilitate understanding by electronic engineers.

FIG. 2A shows a preliminary circuit schematic, for implementing block diagram FIG. 2. This preferred embodiment shows circuit representations for capacitive axial position sensors. Ideally, they provide the symmetrical error signal drawn below the very-high-frequency detector diodes and the difference amplifier which provides that error signal relative to the 6 v reference shown. Notice the increased gain of the error signal, as axial position moves away from nominal height. This gain increase is due to increased sensitivity with proximity, of stationary and spinning capacitive position sensor elements. Another pair of difference amplifiers combine that error signal with the integrator output, shift it to a 2.5 v reference, and supply drive signals to PWM integrated circuits that control respective PWM drive to electromagnet coils 18 and 28.

Figure 5:
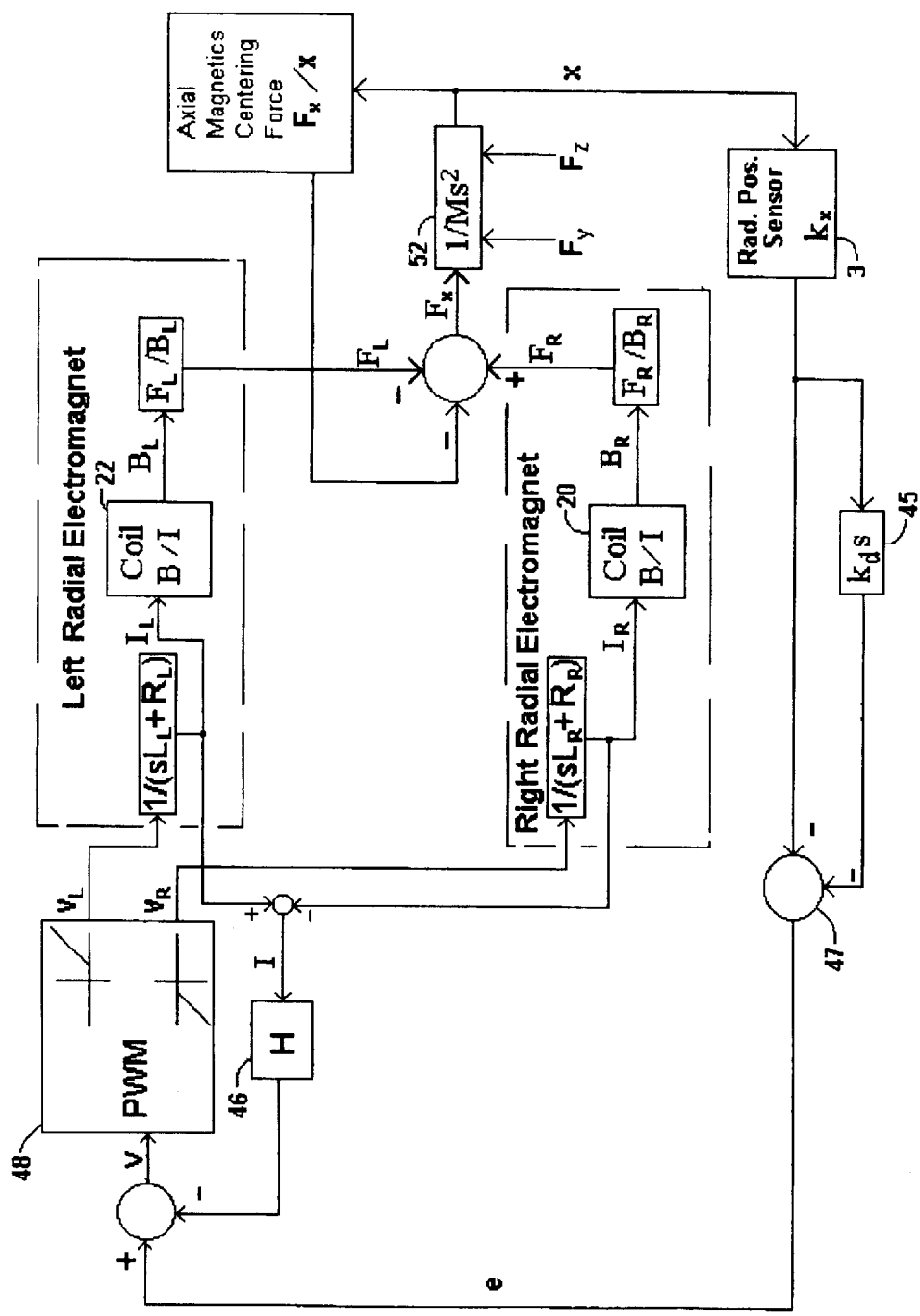
FIG. 5 illustrates a preferred embodiment of one of several radial servo loops for a terrestrial flywheel assembly. It is a concise block diagram, understood by control systems engineers.

FIG. 5 shows a simplified servo block diagram for two diametrically opposite radial electromagnets and associated electronics. Electromagnets at the top of the rotor assembly are represented by coil 20 and core 21, as in FIG. 1. Diametrically opposite electromagnet coil is represented as 22. Transfer functions of their respective coils are designated $1/(sL_r+R_r)$ for the right side coil and $1/(sL_L+R_L)$ for the opposing left side coil. Associated servo electronics are designated by transfer functions for radial position sensor 3 ($K_x$), feedback rate circuit 45 ($K_qs$), summing circuit 47, and rotor assembly mass 52 ($1/Ms^2$). PWM control circuit 48 shows its prescribed deadband and its outputs $V_L$ and $V_R$ to corresponding left and right electromagnet coils 22 and 20. Effect of coil currents on respective pole flux $B_L$ and $B_R$ is shown, with its resulting opposing (left or right) forces $F_L$ and $F_R$. Also shown is the top axial magnetics passive centering force transfer function $F_x/x$ Electromagnets at the bottom (represented in FIG. 1 as coil 80 and core 81) are controlled by like servo loops.

Transfer functions B/I for respective opposite coils denote flux density B vs. coil current I Zero-crossover dead-band is denoted by the 2 graphs in block 48, wherein feedback signal v results in both voltage outputs equal to zero for small excursions within prescribed dead-band. Also shown is output for excursions beyond the dead-band. A polarity discriminator drives 2 PWM circuits, with effective voltage outputs as shown by the graphs in block 48.

Figure 5A:
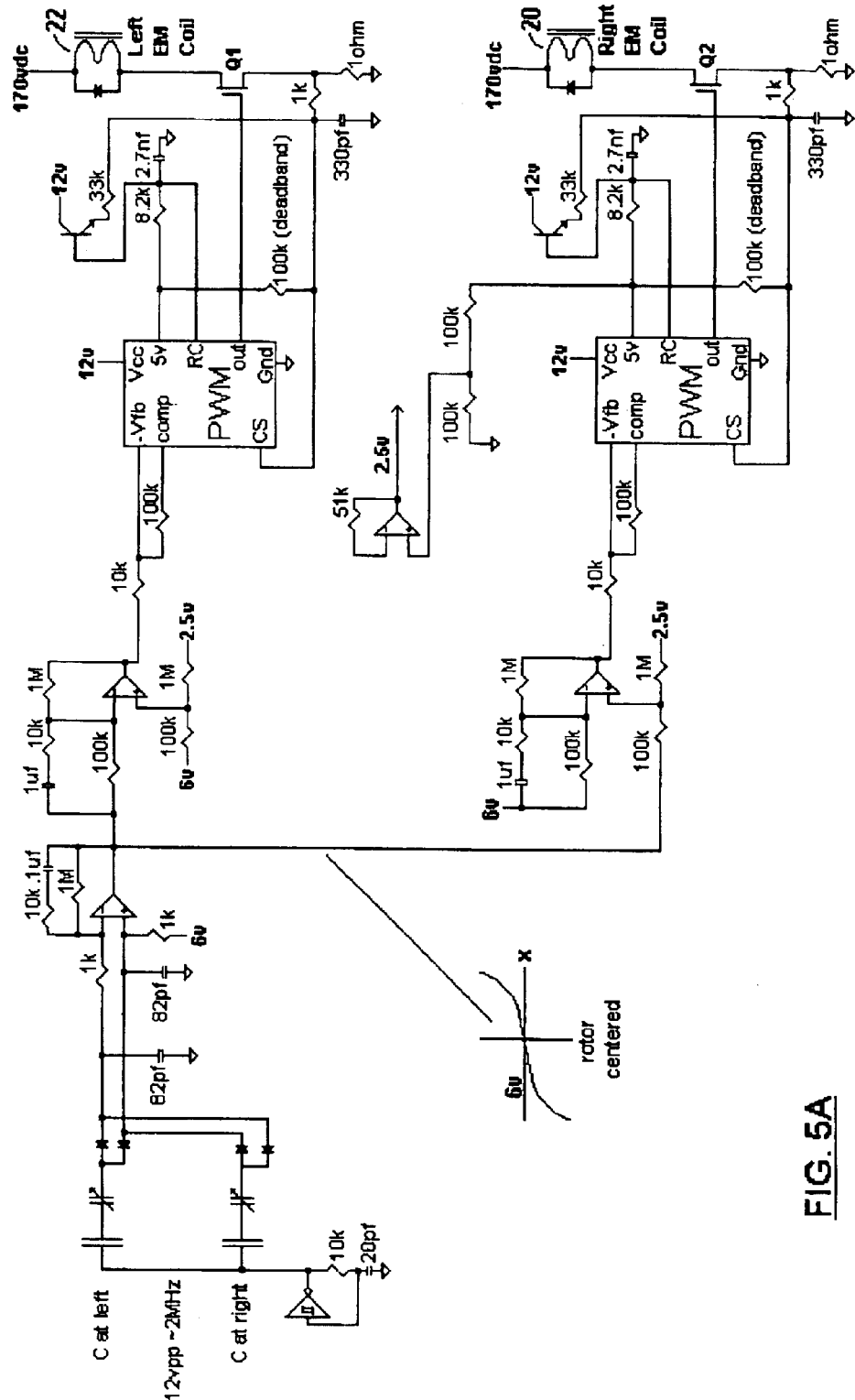
FIG. 5A is a simplified circuit schematic, illustrating a preferred implementation with representative approximate component values, of a radial servo loop for a terrestrial flywheel system, of the present invention.

FIG. 5A shows a preliminary simplified circuit schematic, to implement the radial servo block diagram illustrated in FIG. 5. This radial servo circuit has many similarities to the axial servo circuit FIG. 2A, except that the axial servo circuit includes an integrator to reduce current in the axial electromagnet coils to virtually zero when steady-state operation is reached.

Axial and radial position sensors can be implemented by Hall-effect or magnetoresistive magnetic field sensors, or by capacitive, inductive, or electro-optical means, known in the prior art. Hall-effect and magnetoresistive methods require an isolated magnetic source near the rotor assembly, and possible magnetic shielding or separation by distance from stray magnetic fields. Inductive sensing uses rotor steel to complete magnetic paths, and thereby affect inductance of coils linked thereto. It is relatively immune to stray flux, and stable over continued long use, but requires generally more excitation power; and the cooperative rotor steel incurs continuous hysteresis loss. Electro-optic sensing uses a set of light-emitting-diodes and photo-diodes. It is immune to stray magnetic fields. Although light-emitting-diode efficiency decreases somewhat over time, the resulting loop gain reduction does not seriously affect loop dynamics.

Capacitive sensing uses the distance between a conductive ring on the rotor assembly, to fixed electrodes juxtaposed therewith, to provide rotor position signals. It can tolerate normally steady and relatively low level stray flux near it, in the present invention.

Figure 12:
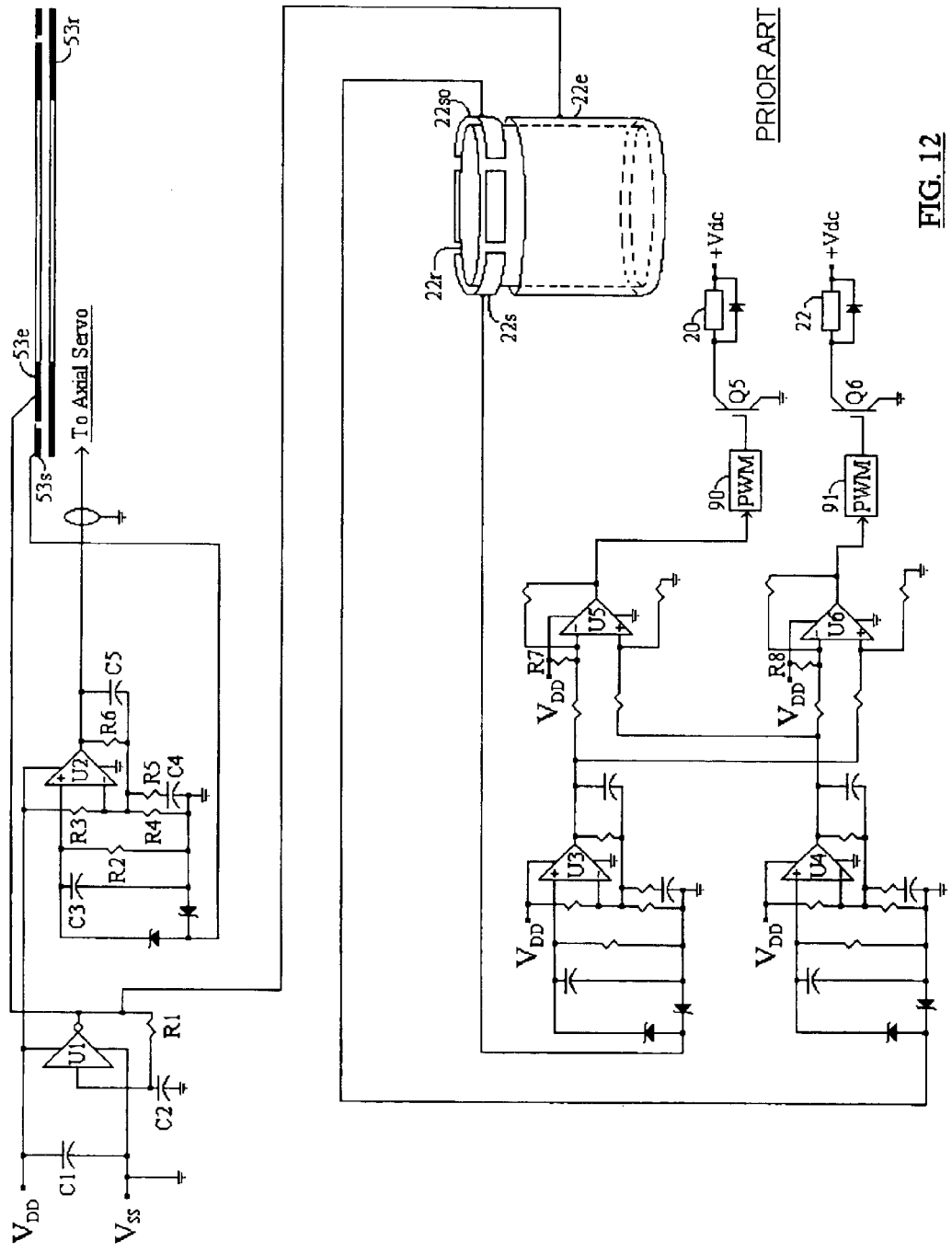
FIG. 12 illustrates capacitive axial and radial position sensors for a rotor assembly. It shows conductive rings having low stray capacitance attached to insulated sections of low dielectric coefficient. It is designated PRIOR ART because it was set forth in U.S. Pat. No. 6,566,775.

A capacitive axial and radial position sensor is set forth here, with reference to FIG. 12; wherein U1, R1, and C2 provide an essentially square-wave excitation at nominally 12 volts peak-to-peak, at a nominal 2 megahertz frequency. For axial position sensing, this excitation voltage is applied to fixed conducting exciter ring 53e, which is juxtaposed and near rotatable conducting ring 53r. The rotatable ring is attached to an insulator segment of the rotor assembly, relatively distant from other conductive material (especially components that might subject it and fixed conductive sensor ring 53s to electromagnetic interference). This arrangement detects axial position, primarily by capacitance between 53s and 53r, and secondarily by capacitance between 53e and 53r. This series capacitance is nominally several picofarads, and varies a few picofarads, with axial movement z from nominal position $z_n$. Capacitance between these adjacent fixed and rotating conductors can be computed from:

$$C = \{8.85 \times 10^{-12} (\text{farad/meter})\} \{\text{Area (meter}^2)\} / \{\text{Separation (meters)}\}$$

which can be combined with the equation:

$$I = \{\text{volts peak-to-peak}\}\{\text{frequency}\}\{C\}$$

to yield rectified sensor output current:

$$I_z = \{V_{DD}\}\{\text{excitation frequency}\}\{C_n/(1-z/z_n)\}$$

where $C_n$ is nominal effective series capacitance between 53e and 53r, and 53r to 53s (and accounts for a small stray capacitance between 53r to ground), z is axial movement, and $z_n$ is nominal axial spacing between the fixed and rotatable rings.

The rectified signal is filtered by C3 and amplified by operational amplifier circuit U2, whose midband gain is (R4+R6)/R4. C4 provides rate feedback for the axial servo. C5 and R5 provide high frequency gain roll-off. R3 provides an output level adjustment. To minimize stray capacitance and signal corruption, this part of the axial servo electronics is located near fixed ring 53s. Faraday shields, to maintain signal integrity, are connected to circuit ground.

Rotatable conductive cylinder 22r is similarly attached to an insulator segment of the rotor assembly. It is capacitively coupled to excitation at nominal 2 megahertz via fixed exciter cylinder 22e. Radial motion x is sensed by diametrically opposite, fixed electrodes 22s and 22so. They provide respective rectified signals:

$$I_x = \{V_{DD}\}\{\text{frequency}\}\{C_n/(1+x/x_n)\}$$

and $$I_{xo} = \{V_{DD}\}\{\text{frequency}\}\{C_n/(1-x/x_n)\}.$$

These radial position signals are likewise amplified, by operational amplifier circuits U3 and U4, which likewise provide rate feedback and high-frequency roll-off. Respective U3 and U4 outputs are applied to differential amplifiers U5 and U6. Dead-band is set by R7 and R8. When dead-band is exceeded in one direction, U5 provides an output. When dead-band is exceeded in the opposite direction, U6 alternatively provides a like output. These signals are applied to respective PWM drivers 90 and 91, which control respective radial electromagnets 20 and 22 through PWM power transistor switches Q5 and Q6. Sensor electrodes to detect radial motion 90° from that sensed by 22s and 22so are illustrated without associated radial servo circuits in FIG. 12 between 22s and 22so. Circuits which complete the radial servos, controlling radial electromagnets aligned with these electrodes, are identical to those shown with 22s and 22so. A preferred embodiment includes four upper electromagnets with corresponding sensor electrodes and radial servos, plus four lower electromagnets with like electrodes and servo circuits. They are preferably packaged within the flywheel enclosure, with U3, U4, and other low-signal-level circuits packaged in close proximity to their respective sensor electrodes. In FIG. 1, the high-frequency circuit parts which need to be in close proximity with the sensor elements are shown as blocks 24, 24a, and 24b. The number of hermetic feed-throughs is thus minimized, by including some or all parts of the radial servos within the flywheel enclosure. Although upper and lower radial position sensors must be located at opposite ends of the flywheel rotor assembly, axial position sensors can be located at one side. In FIG. 1, to avoid crowded details, 24a and 24b are shown at opposite sides of rim 15. But they are preferably both positioned, along with their respective electrodes, near each other.

The capacitive position sensors set forth above have a non-linear response (illustrated in one of several alternate circuit embodiments FIG. 2A and FIG. 5A) to rotor assembly position. Gain at small gaps can be several times higher than at large gaps. This complicates the servo loop dynamics. However, it affords an inherent opportunity to have magnetic bearings that stiffen in response to larger excursions from nominal positions, in all directions approaching near contact between the rotor assembly and adjacent stationary parts.

Figure 16:
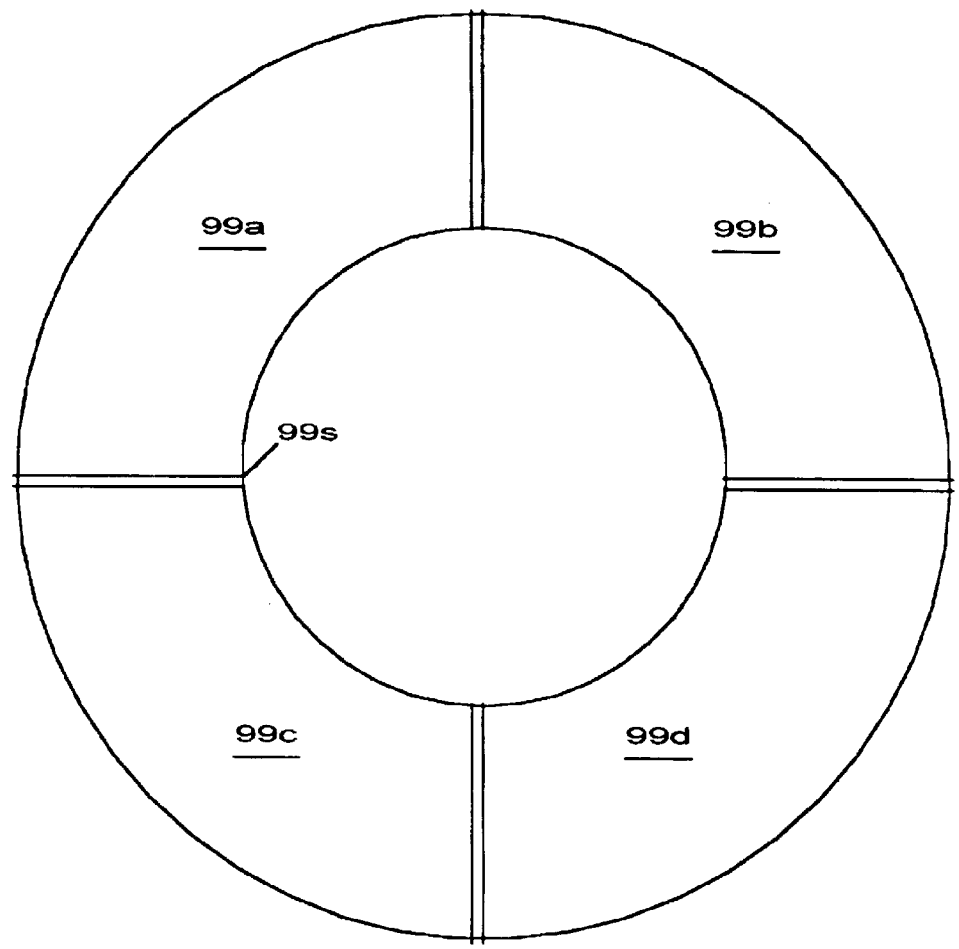
FIG. 16 illustrates grounded Faraday shield segments, separated by non-conducting slits, between and connected to axial magnetic poles, to suppress EMI from high-frequency PWM drive to an electromagnet coil between and concentric with the magnetic poles.

The integrity of any high impedance, low power, high bandwidth signal, can be impaired by EMI, especially when there are nearby conductors connected to high power PWM switch-mode drive having very high frequency components. Besides short leads between sensitive circuits and grounded Faraday shields around them, other techniques are provided by the present invention. They include ground connections to moderately conductive steel parts including 17, 17a, 21, 12, and 81, in FIG. 1. They also include attaching thin conductive segments, preferably copper, across 17 and 17a, and across the poles of 12. These segments are designated 99a, 99b, 99c, and 99d in FIG. 16. Insulating radial strips typified by 99s are needed to prevent eddy current in this shield, which otherwise would amount to a shorted turn, that conducts high circular eddy currents having paths like conductors of the coil whose EMI they block. The Faraday shield's ability to block EMI is not compromised by narrow insulating strips, if the strips have very small areas compared to segments they separate.

FIG. 11 shows a cross-sectional view 99 of the conductive shield segments, plus signal ground connections to 17 and 17a. Since permanent-magnet 16 is typically not a good conductor, grounded copper or aluminum shield 98 may surround permanent-magnet 16, to further suppress EMI that may emanate from coil 18. This shield can be a continuous cylinder, with no slits to prevent circular eddy current concentric with coil 18. There can be ample space for stray EMI from coil 18 to attenuate before reaching shield 98, so eddy losses in shield 98 during times when PWM drive is applied to coil 18, will not be significant.

Figure 16A:
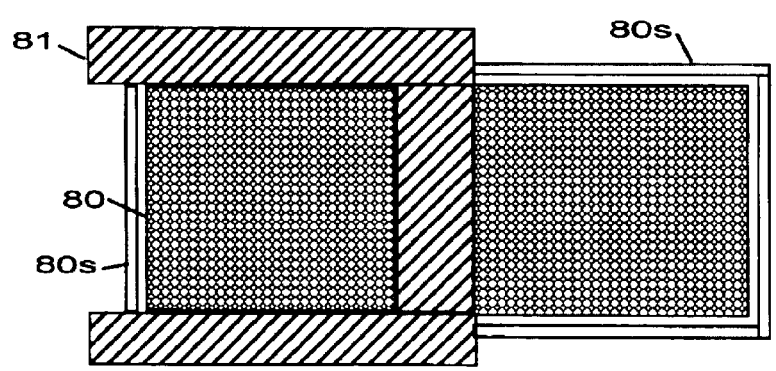
FIG. 16A illustrates a typical grounded Faraday shield around a representative radial electromagnet coil, to suppress EMI that may emanate from its high-frequency PWM drive.

FIG. 16A shows grounded conductive segments 80s around typical radial electromagnet coil 80. These segments are also separated by insulating strips. Here they would be oriented axially and radially, to block high semi-circular eddy currents in the conductive segments (that would parallel the coil conductor contour), which would otherwise cause high losses.

As shown in FIG. 11, the system may also include capacitively coupled active grounds, to conductive parts on the rotor assembly including steel 10. And they may include conductors such as cylinder 13 in the rotor assembly. It extends the active ground within the rotor assembly by contact with 10. Cylinder 13 is preferably aluminum, so it will not block the magnetic field from the rotor magnets from reaching rotor angle sensor 1.

In FIG. 11, an accessible surface of 10 on the rotor assembly is capacitively coupled to EMI sensor electrode ring 99i. The electrode is connected to the input of a high-bandwidth inverting amplifier feeding electrode ring 99e, which is also capacitively coupled to 10. The reference signal input to the amplifier is connected to a signal ground within shielded local electronics module 24a. The amplifier drives electrode 99e, within its bandwidth capability, to reduce EMI on sensor 99i. These techniques can help provide high-integrity rotor-assembly axial and radial position signals. High-integrity signals are essential to robust axial and radial servos.

Abnormally high and sustained electromagnet activity, excluding that required to damp normally slight vibration at certain resonant frequencies, may indicate incipient rim failure. It may also indicate effects of abnormal seismic activity. In either case, discriminators having over-ride control of electronics which control the motor/generator and backup bearings, can inhibit motor/generator drive whenever any of the servo drive levels exceed a prescribed maximum over a prescribed time interval. They would also initiate the power-down sequence described herein. This feature can help prevent flywheel damage and possible explosion.

Clearance between the rotor spindle and backup bearing contact surfaces should be smaller than distances between a nominally centered rotor assembly and any other stationary part. When the flywheel assembly is in contact with either the upper or lower backup bearing, pressure on the contact surfaces is mainly due to the rotor assembly weight minus lift from the axial levitation means, plus abnormal external acceleration. Cushioning provided by an annular spring, preferably on the rotor spindle, can absorb shock and reduce impact forces. Contact surfaces, that allow rotor spin by sliding, preferably have large contact areas, to reduce contact pressure and to provide high thermal conduction, in a direct and large area path as is practical, to the flywheel enclosure. The most simple and lowest cost embodiment of the invention has journal backup bearings with beveled sliding contact surfaces, such as 23.

Journal type mechanical backup bearings, with sliding contacts, can be troublesome, if the power-down sequence engages them while the rotor assembly is spinning at high speed for extended periods. If that operating mode needs to be accommodated, rolling contact bearings which don't need lubrication, would provide far higher reliability.

Rolling contact bearings, with rolling separators between ball or roller bearings, instead of conventional sliding retainers (also known as cages), and instead of journal bearings with sliding load-bearing surfaces, would depend far less upon lubrication. However, they are not widely manufactured and distributed, mainly due to manufacturing difficulties.

According to the prior art, rolling contact bearings confront manufacturing problems, due to difficult assembly and need for close dimensional tolerance. Improvements to circumvent these problems are set forth herein with reference to FIG. 14 and FIG. 15. These figures are designated PRIOR ART because they are set forth in U.S. Pat. No. 6,566,775.

These improvements should facilitate production assembly processes, permit less stringent dimensional tolerances, and provide rolling contact between load-bearing balls and separators that is not intermittent. It also permits rolling separators and related elements of this invention to be substituted directly for sliding cages of conventional ball bearings.

FIG. 14 illustrates a cross-sectional view, through its spin-axis, of a preferred embodiment of the improved rolling contact mechanical bearing. FIG. 15 illustrates an axial cross-sectional view, in a plane perpendicular to the spin-axis, of the improved bearing.

Conventional inner bearing race 40 has an inner diameter intended for standard shaft attachment. Its outer diameter has an annular groove recess to provide a raceway for a plurality of ball bearings 41 each having equal radii smaller than the curvature of the raceway, to remain centered with the raceway and maintain essentially point contact while rolling thereon.

Outer bearing race 39 likewise provides a rolling surface for the ball bearings. Separator rollers 42 are interposed between each ball, to maintain equal spacing between balls and prevent scraping between otherwise adjacent surfaces which move in opposite directions. The separator rollers spin in rolling contact with the balls. The separators are necked at their axial centers, with a neck radius larger than the ball radius, to remain centered axially and to maintain essentially point contact while rolling therewith, along a contact circumference of the separator at its center.

The separators are restrained from moving radially outward of the bearing axis by outer idler race 43, which provides a rolling surface that makes contact with the separator along a recessed neck circumference centered therewith. The separators are restrained from moving inward by inner idler race 44, which makes rolling contact with the same recessed neck circumference.

This is the preferred embodiment, because there is no outward thrust on the separators due to contact with the balls, and ball separation can be maintained with minimum contact forces between the balls and the separators. Insofar as the inner bearing race spins, separator skew will tend to be corrected by gyroscopic precession torque, acting on the separators at their high spin rates. Separator precession is zero when its spin axis is parallel to the bearing spin axis.

U.S. Pat. No. 6,566,775 derives proportions where the inner idler race does not need to rotate relative to the outer bearing race. So it can be in contact with cover 45, which is affixed to the outer bearing race. Cover 45 is preferably a metal and is radially rigid to stiffen the inner idler. Its radial stiffness permits the inner idler to be a relatively thin, radially compliant and elastic ring, to facilitate its assembly with the separators, outer idler, and ball bearings.

To further facilitate assembly, the inner idler can be made even more compliant radially, by having equally spaced axial grooves in its inner circumference, spaced to have several grooves distributed evenly within an angle of 360°/(number of balls). Mechanized assembly is thereby facilitated, that is far easier and less costly than assembly of rolling contact bearings of the prior art. Added parts and processes will increase cost only slightly over conventional ball bearings.

Hollow thin-wall separators fabricated from annealed spring steel tubing that is then necked by a metal spinning process, then heat treated to extend its elastic deformation range, allows the separators to be more easily assembled with the ball bearing while maintaining a zero or very small clearance for the assembly. Solid materials used in the prior art require much closer dimensional control, and do not facilitate practical assembly of separators designed for zero or very small clearance fit.

The outer idler race spins at a high speed, and therefore is subjected to centrifugal forces due to its own mass. The hollow thin-wall separators that it also supports against centrifugal forces will subject outer idlers to forces lower than heavier solid members used in the prior art.

Another advantage of thin-wall separators, fabricated from material operating well within its elastic limit, is their low strain in this separator implementation. Both these factors combine to result in extremely low rolling loss from mechanical hysteresis. Metals are preferable to plastic, which has lower thermal conductivity and will outgas far more than metals. Plastic also has high rolling loss due to mechanical hysteresis. Local heat buildup can be destructive if backup bearings are engaged in the event of a prolonged abnormal condition, with the flywheel spinning at maximum speed.

With zero maintenance and long life, which should result from the improvements provided by this invention, underground installation would be practical. The flywheel assembly enclosure is preferably mounted with 2-axis gimbals (90° apart) supporting it from its top by a rigid member, so that it will be inherently self-leveling.

The gimbals constrain the enclosure so that it does not rotate due to reaction from stator torque, and inherently maintain the enclosure verticality by gravity alone. Thus, verticality will be maintained, even if the earth at the installation site were to shift from its initial leveling.

The preferred flywheel enclosure installation site is in a cylindrical hole prepared for this purpose. The hole will preferably be dug in a construction area planned to be covered by a reinforced concrete slab floor, for a parking or storage area, prior to pouring concrete for that area's floor. Back-fill is then poured into the cylindrical hole, and compacted to support the liner, which protects and maintains a clean space for the flywheel enclosure, and conduit connecting it to wall-mounted associated electronics, in the area constructed above the floor.

The liner also facilitates installation of far more costly items (like the flywheel in its enclosure) at a later date, when they can be protected from vandalism, theft, and inadvertent damage from building construction activity. Back-fill can then be poured around the liner, and the concrete slab floor poured above it, around an annular insert having a removable (with special tools) steel cover plate fastened thereto.

The back-fill is preferably a porous sand mixture, which is readily available at construction sites, is low cost, is not flammable, not degradable, and can absorb an explosive blast without a high pressure reflected shock wave. The concrete slab, and the cover plate over the flywheel enclosure, should provide an effective barrier, to protect people in and around the building, and prevent damage to the building in the event of a possible exploding flywheel.

Associated electronics, connected to the flywheel enclosure by an electrical conduit having protective metal armor around it, is preferably housed in a single wall-mounted cabinet. This provides convenient access for viewing its data monitor at the cabinet front, and for setting command variables like startup, shutdown, time-of-day power storage, power-down, and possible power schedules for discretionary loads. It also provides a clear air flow path, to cool electronics in the cabinet with filtered air.

Installed as set forth hereabove, the flywheel enclosure need not be capable of containing a possible flywheel explosion. The enclosure is preferably constructed of light thin-wall metal, such as aluminum, mainly because it will outgas far less than many other materials, can be fabricated to high precision tolerances, and can withstand possible bumping and scraping during assembly and handling procedures without damaging its structural or interior vacuum integrity. A preferred embodiment will contain absorptive and adsorptive getters in the enclosure, to help maintain its interior vacuum. A small vacuum pump, responsive to idling loss, can be added, to automatically prevent long-term vacuum loss.

Prior to and during installation, the rotor assembly shown in FIG. 1 will be mechanically constrained in its upper-most position, with the beveled bearing surface of cylindrical member 23 in mechanical contact with a juxtaposed bearing surface concentric with and affixed to the rotor. It will be appreciated that, in this position, like bearing surface contact will be made at the top of the rotor assembly, and that magnet 16 will have a closed high-permeability path for its flux. The upper-most position can be sensed by increased current in stalled motor 26, for a duration exceeding its likewise increased acceleration current when first activated. A discriminator that senses when this higher current and duration exceeds selected levels will then remove drive to motor 26. Jackscrew assembly 27 will then be held in place by friction, mostly from motor 26.

After installation in a stationary site, and then connection to a source of DC power, the system will be ready to execute, upon receiving a local or a remote operator command, a coordinated power-up algorithm that includes the following sequential steps:

(1) Connect drive to motor 26, until jackscrew mechanism 27 lowers mechanical contact 23 to its lowest position. Again, reaching that position can be sensed by motor 26 current and duration at higher current as described above. The rotor assembly will remain at its upper-most position, held there by lift force on pole 10 due to flux from magnet 16, until (2) The axial servo shown in FIG. 1, FIG. 2, and FIG. 2A is enabled. Downward force from current in coil 28 will then pull the rotor assembly down, until it reaches its nominal prescribed axial position, as determined by axial position sensor 53. Integrator 49 will then begin to provide a servo loop signal to automatically adjust rotor height for zero current in coils 18 and 28.

(3) After the axial servo is near to or reaches steady-state, regenerative motor control electronics 33 can enable H-bridge 34 to begin accelerating the flywheel rotor assembly. Unless a power-down algorithm is executed, the regenerative motor is then continuously controlled by voltage feedback from the DC power buss and various signals that can inhibit motor drive.

If a shutdown command is received from an abnormal event discriminator, or from a local or remote operator command, the system will execute a coordinated power-down algorithm that includes the following sequential steps:

(1) Inhibit motor drive and decelerate the rotor assembly by regenerating power to discretionary loads, thereby decreasing spin speed.

(2) After spin speed is lowered, to a level so that the mechanical backup bearings can safely support the rotor assembly, connect drive to motor 26 until the rotor assembly reaches its upper-most axial position. An axial servo position signal (not shown in FIG. 2), which lifts the rotor assembly under control of axial forces from current in coils 18 and 28 will preferably precede this action. Motor 26 drive can be terminated, again by sensing its stall current and duration.

(3) Continue rotor assembly spin-down, from combined regenerative motor loading and mechanical bearing friction, until the rotor assembly stops spinning. The flywheel can now be safely moved, inspected, and serviced if needed.

The power-up and power-down algorithms are each preferably implemented by CMOS IC latches and signal level discriminators, with capacitors and resistors that provide selected time delays and detection levels. They control associated motor/generator power interface circuits and a bi-directional drive circuit, which supplies drive power to small DC motor 26, which positions jackscrew assembly 27 (shown in FIG. 1). These IC parts and the small DC motor consume near zero standby power, and are commonly available from various manufacturers.

Simplifying operator command interfaces, by responding to simple operator commands by performing a relatively complex sequence of critical actions, which will not damage the system, enhances system reliability and robustness. Abnormal vibration detection, resulting in controlled power-down, enhances system robustness and safety. Prior art flywheel systems, which do not include these safeguards, are susceptible to damage from possible operator errors. And prior art flywheel systems, which cannot detect abnormal vibration, are susceptible to possible progressive and far more serious damage, to the system and its installation site.

Figure 7:
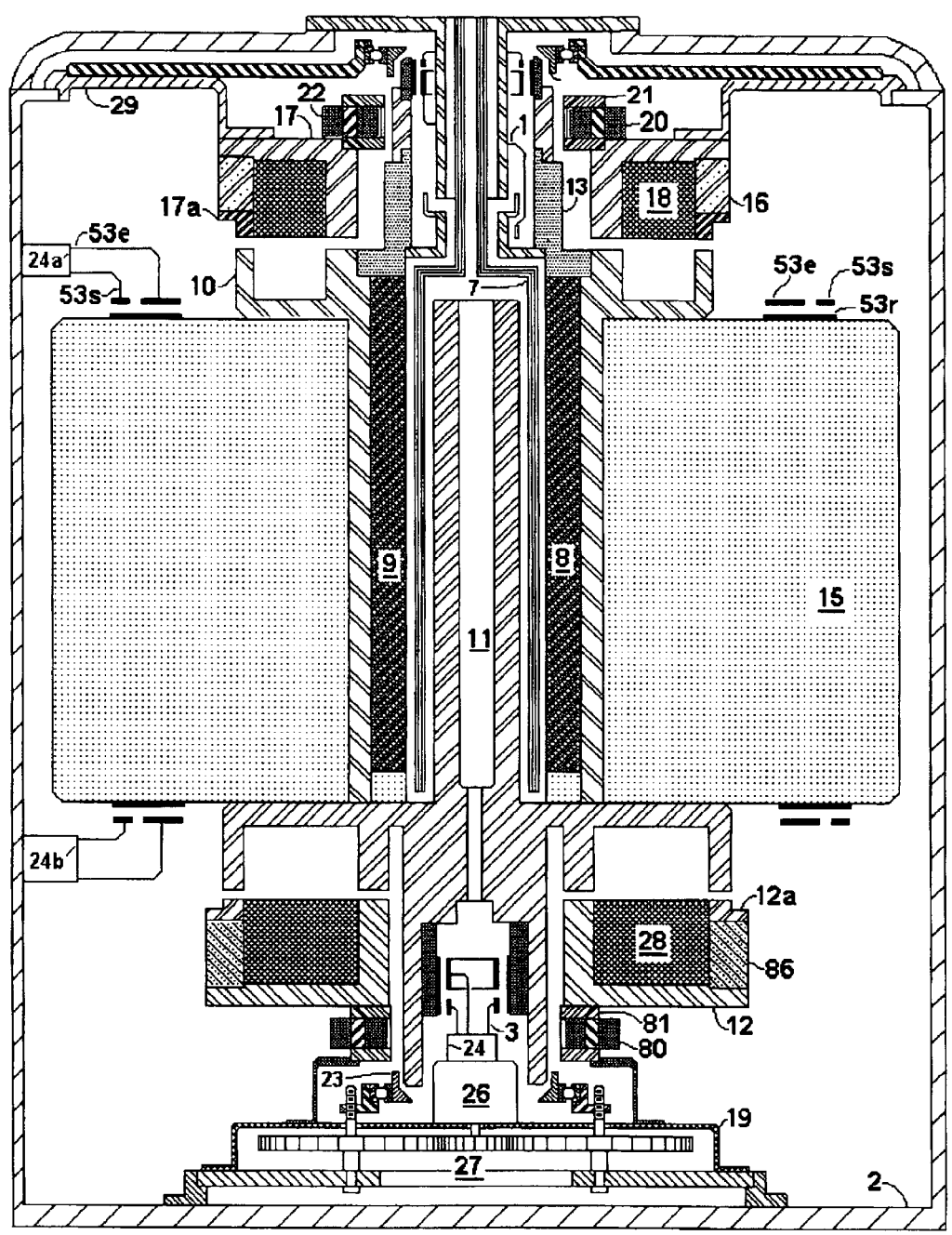
FIG. 7 illustrates a cross-sectional view through the spin-axis, of the flywheel, magnetic bearings, motor/generator, backup mechanical bearings, and housing, for a flywheel system intended for use on orbital satellites. It is in accordance with standard drafting practice. But where exact proportions of the various component sizes are not relevant, it is not drawn to scale, so that it can concisely convey all essential features of the present invention.

FIG. 7 shows a cross-sectional view of a flywheel assembly that is very similar to FIG. 1. It is intended for applications onboard orbital space satellites, where it would be in a "weightless" environment. In orbit, gravitational force and centrifugal force are equal and opposite.

Its main difference compared to FIG. 1 is that FIG. 7 includes axial magnet 86 and annular steel pole 12a. Along with an axial servo, they provide axial positioning without consuming power, when steady-state operation is reached. They also provide passive radial centering, at both ends of the rotor assembly. They are also needed because gravity will not help to maintain alignment between the rotor and stator in space.

Figure 7A:
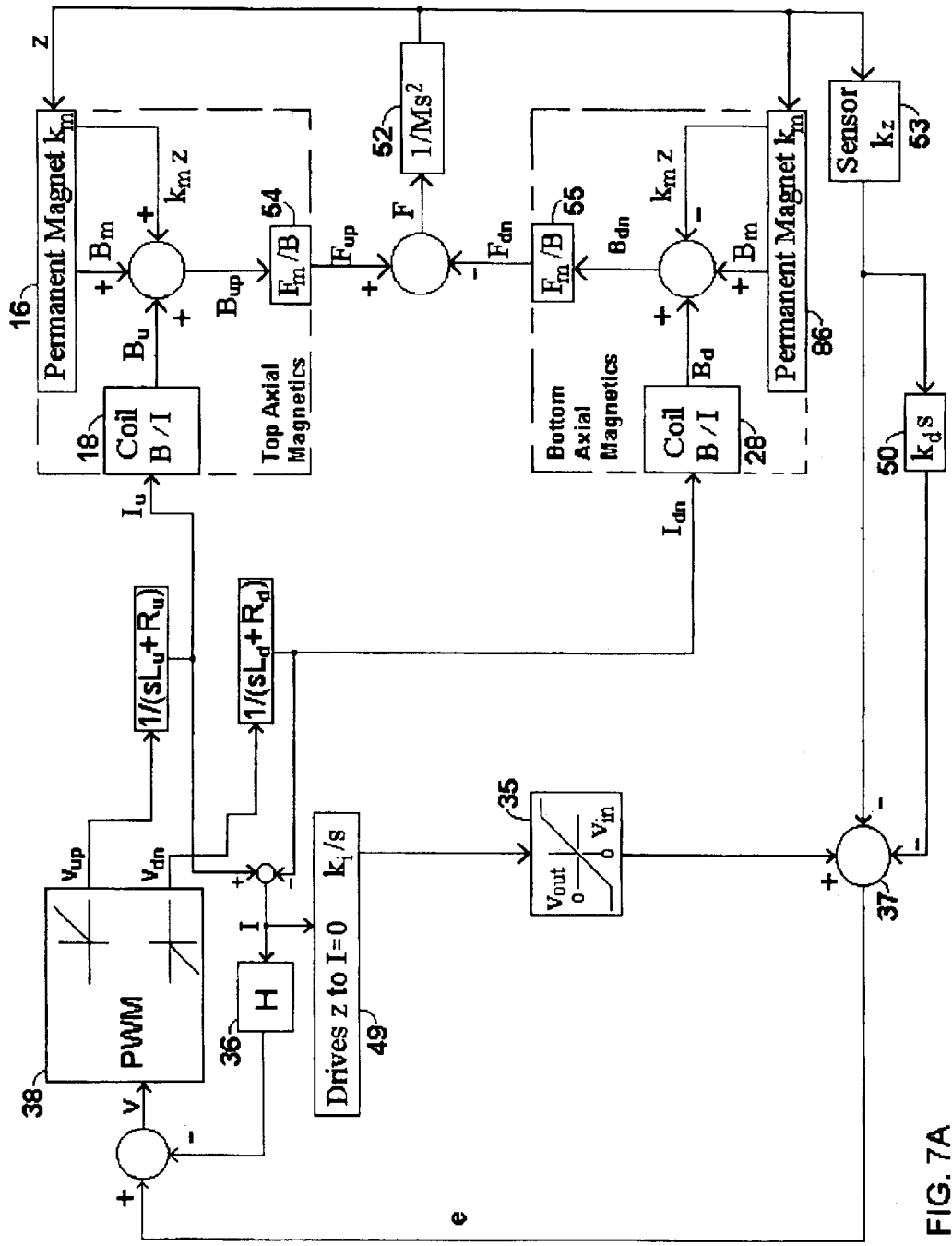
FIG. 7A illustrates a preferred embodiment of a servo loop to stabilize axial levitation, for a flywheel system intended for use on orbital satellites. This representation shows how the various system components relate to each other, and will be understood by control systems engineers.

The axial servo block diagram, for this configuration, is shown in FIG. 7A. It will be noted that FIG. 7A is identical to the axial servo block diagram in FIG. 2, except that FIG. 7A includes magnet 86, and does not include the effect of gravitational force. The preliminary circuit schematic, to implement the block diagram shown on FIG. 7A, would be identical to the simplified circuit schematic shown on FIG. 2A.

No vacuum enclosure with hermetic connectors is needed, because typical altitudes above earth for LEO (low-earth-orbit) and geostationary satellites, and other space vehicles, provide an adequate vacuum environment to achieve virtually zero windage losses. Rotor assembly energy loss, due to viscous drag of molecules in typical space missions, is indeed negligible.

Figure 7B:
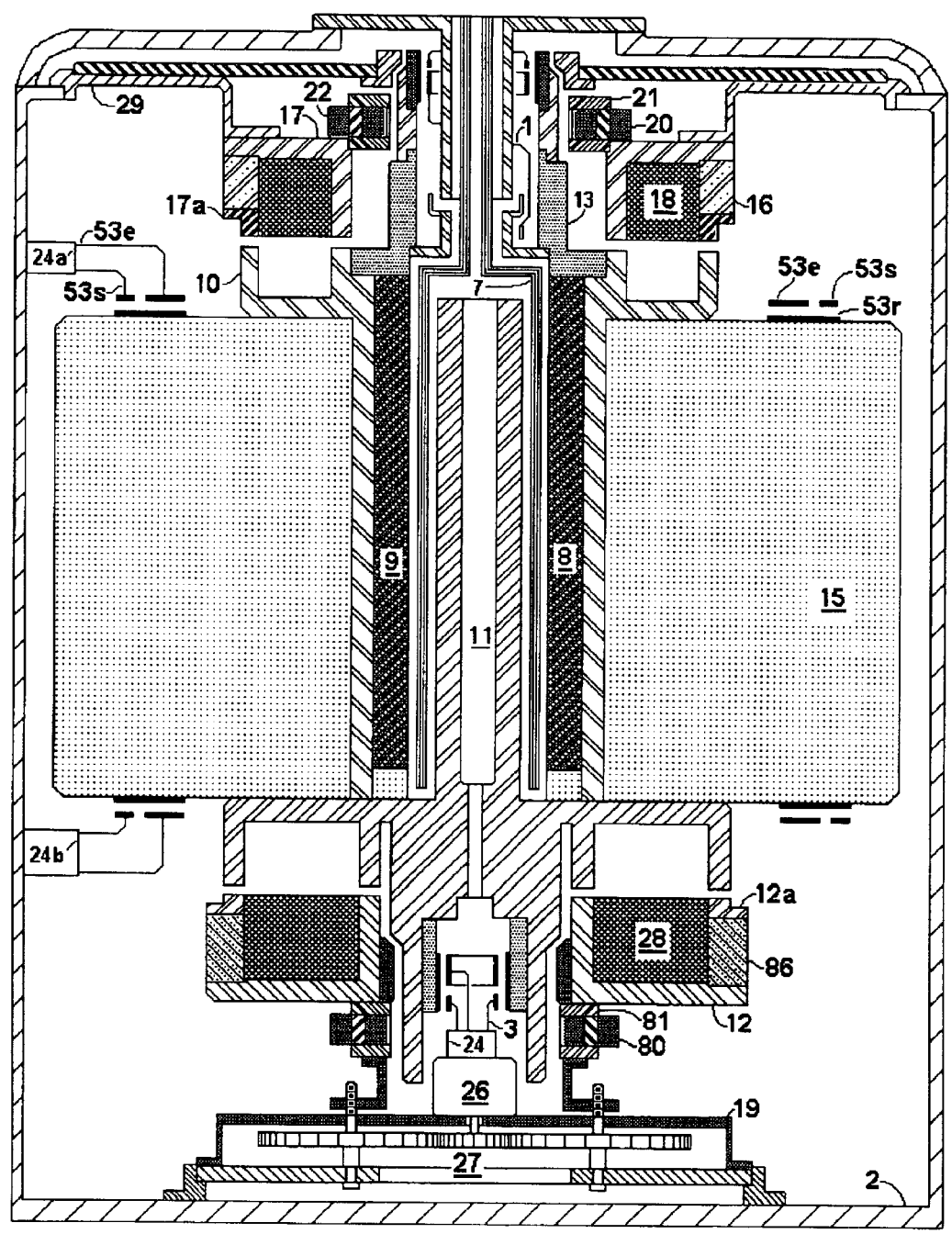
FIG. 7B illustrates a cross-sectional view through the spin axis, of an alternate embodiment flywheel assembly, intended for use on orbital satellites.

FIG. 7B shows an alternate embodiment for use onboard orbital satellites. After launch, the mechanical backup bearing would disengage. The lower mechanical backup bearing would preferably have beveled contact surfaces respectively affixed to 11 and 12. That way, magnets 16 and 86 would have closed high-permeability flux paths, during idle periods prior to and during launch. This provides a "keeper" for both magnets, to maintain magnet strength if the system is subjected to very wide temperature extremes and high vibration during such idle periods.

Aboard orbital satellites, the flywheel systems shown in FIG. 7 or alternate embodiment FIG. 7B, with its electronics, would be interconnected and used in combinations of 2, 3, or 4 coordinated systems. Those combinations serve to cancel combined reaction torques from their motor/generators, while storing and supplying electric power. They also enable the combined flywheel systems, affixed to the satellite, to provide precise inertial attitude control, by using their radial servos to control angular precession rates.

Figure 13:
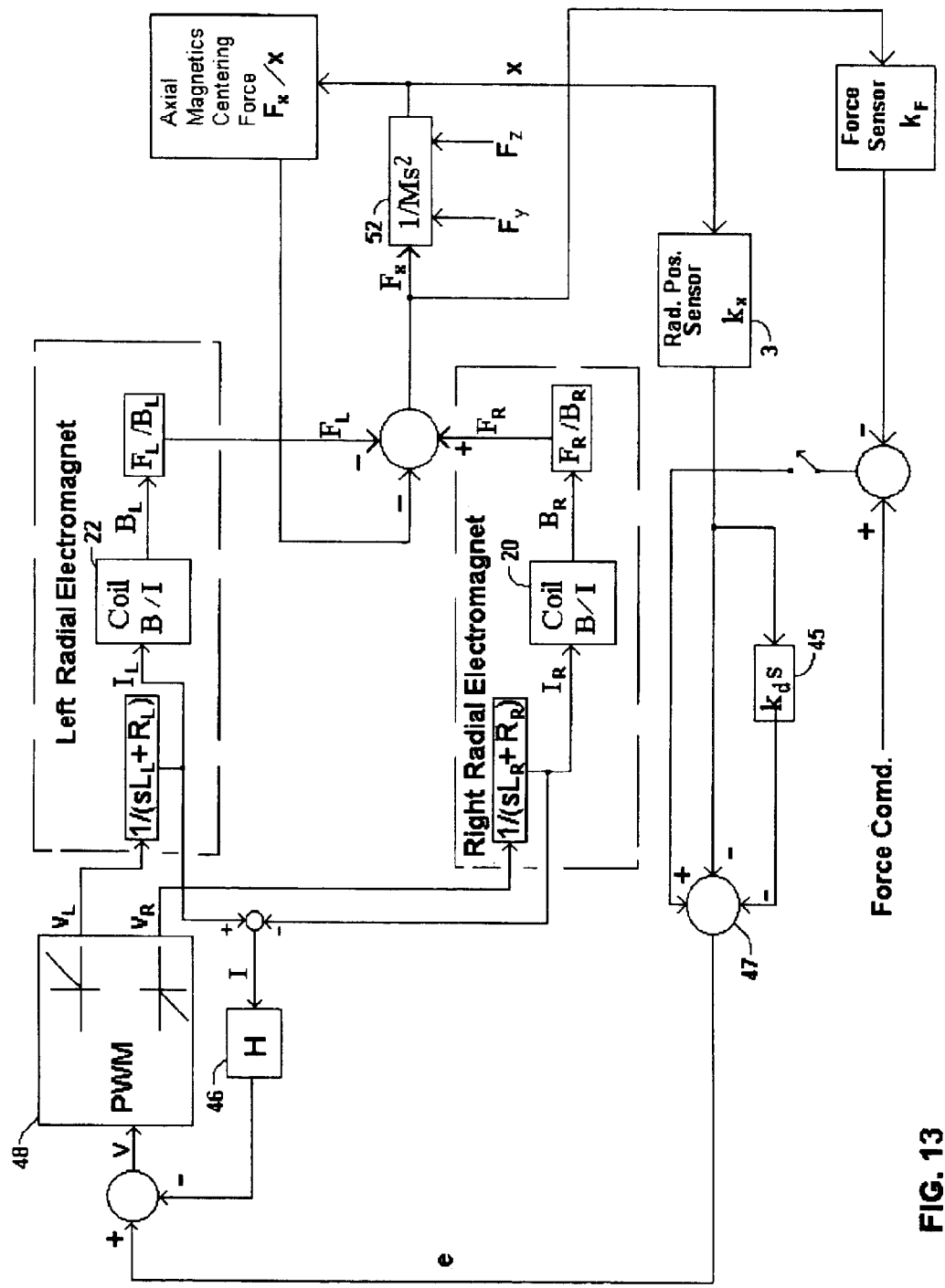
FIG. 13 illustrates a preferred embodiment of one of several radial servo loops for an orbital satellite flywheel system. It is a concise block diagram, understood by feedback control systems engineers. It includes both flywheel rotor centering and spin-axis torquing functions.

A block diagram for a radial servo, that also provides precession rate control, is shown in FIG. 13. Each flywheel system preferably includes 4 such radial servos. This embodiment, intended for use onboard orbital satellites, includes means to apply a force command. It includes a force sensor ($K_F$) between each electromagnet core and its support, in feedback loops, to insure that forces applied by the radial electromagnets accurately follow the force command. A type of preferred force sensor, which has been manufactured for decades, is known as a piezoelectric transducer. It is consistent, reliable, and rigid, producing a precise voltage output with virtually no deformation. Piezoelectric crystals were discovered over a century ago. Servo dead-band is considerably smaller than in the terrestrial embodiment shown in FIG. 5. A smaller dead-band for satellite embodiments facilitates more accurate inertial attitude control. Also, less dead-band here is possible, because the spin axis does not need to precess due to earth rotation, and passive centering from axial magnetics is provided at both ends of the rotor assembly.

Figure 8:
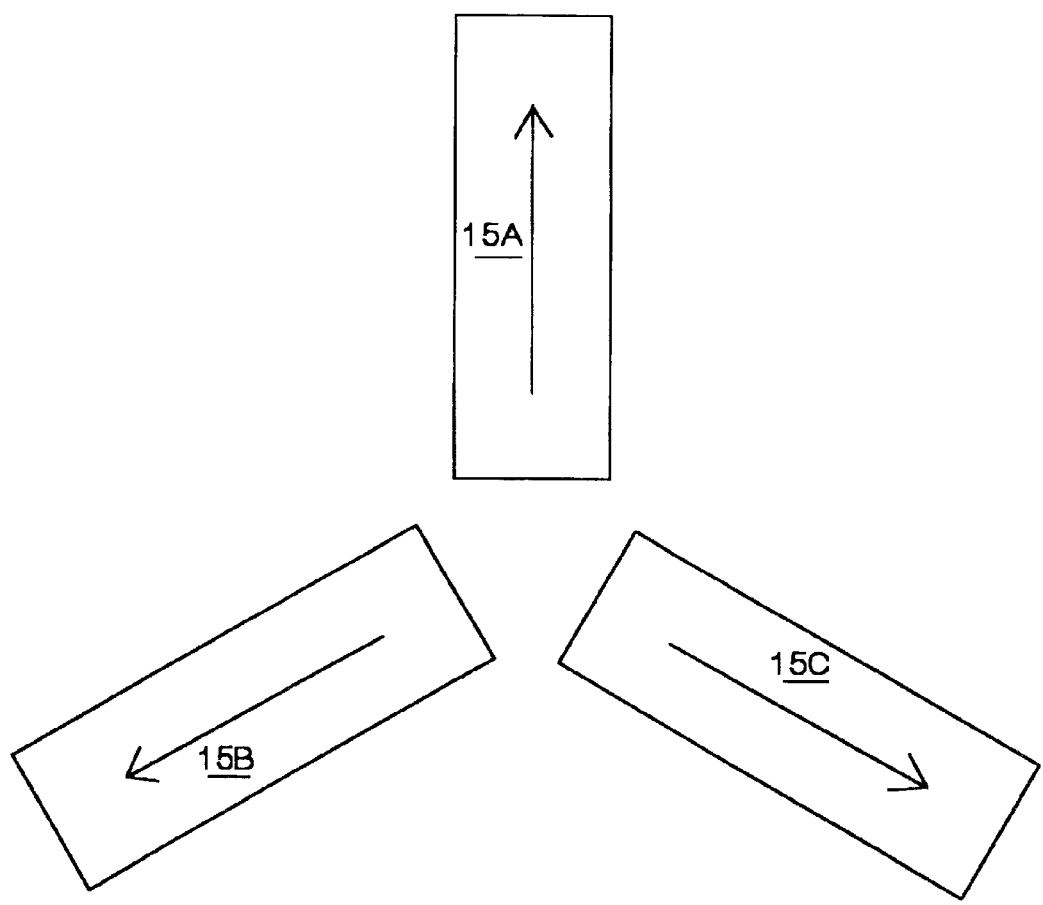
FIG. 8 illustrates a combination of 3 flywheel systems, shown as rectangles positioned 120° apart in the plane of the drawing, affixed to an orbital satellite having photovoltaic solar panels, to provide it electric power storage and regeneration plus 3-axis attitude control. Each rectangle represents the flywheel assembly shown in FIG. 7. The arrow shown within each rectangle represents the spin vector of the corresponding flywheel rotor assembly.

One such combination, of 3 flywheel systems, is illustrated in FIG. 8. Respective identical matched flywheels there are designated 15A, 15B, and 15C. Their respective spin velocity vectors are each designated by an arrow. Stationary parts of the 3 flywheel systems, including the motor stator and stationary parts of the magnetic bearings, each are affixed to the satellite. Their respective rotor assembly spin axes each are normally centered and aligned therewith. Each is positioned in the plane of FIG. 8, 120° apart.

When their regenerative motors accelerate or decelerate their respective rotor assemblies, applied torques are carefully matched. Their respective spin speeds are also matched. It will be appreciated that combined reaction torques of the 3 motors will therefore always combine so there will always be no net reaction torque therefrom. Thus power can be stored and regenerated by the 3 flywheel systems without net reaction torque on the satellite.

If forces, each of equal magnitude, are applied by the radial electromagnets, out of the plane of FIG. 8 at the outer end of each rotor assembly, and into the plane of FIG. 8 at the inner end of each, the 3 flywheels will precess clockwise at an equal angular rate. It will be appreciated that the sum of these vector forces will always be zero. The satellite will rotate along with the 3 flywheels, at this precession rate, which is proportional to the applied forces. If the forces described here are reversed, the 3 flywheels, with the satellite, will precess counter-clockwise.

If forces are applied by their radial electromagnets, to rotor assemblies 15A and 15B, causing clockwise torque on the spin axis of 15A and counter-clockwise torque on 15B, satellite rotation coincident with the spin vector of 15C will result. Rotation speed will be proportional to the applied forces. Like forces applied to rotor assemblies 15A and 15C will cause satellite rotation coincident with the spin vector of 15B. Like forces applied to 15B and 15C will cause rotation coincident with the spin vector of 15A. If reverse forces are applied, reverse rotation will result.

Satellite rotation by the 3-flywheel combination described here can accurately control its angular attitude in pitch, yaw, and roll. But an algorithm would be needed, to command the rotations along the axes 120° apart, so that desired attitude in 3 mutually orthogonal axes results.

Figure 8A:
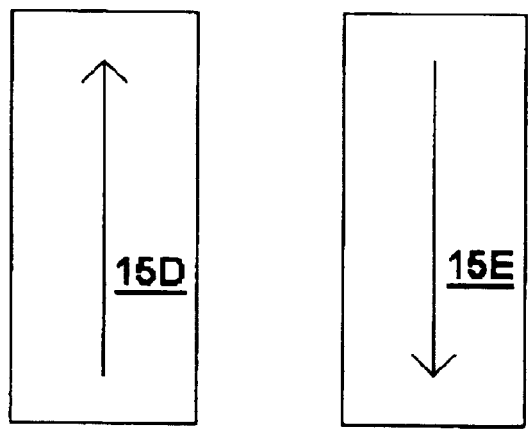
FIG. 8A illustrates a combination of 2 such flywheel systems, shown as parallel rectangles affixed to an orbital satellite having photovoltaic solar panels, to provide it electric power storage and regeneration plus 2-axis attitude control by rotor assembly precession. The arrow shown within each rectangle represents the spin vector of the corresponding flywheel rotor assembly.

A 2-flywheel system, to provide power storage and regeneration, along with 2-axis satellite attitude control by precession, is shown in FIG. 8A. The spin vectors of flywheel systems 15D and 15E are parallel and in a common plane. It will be appreciated that equal and opposite reaction torques, from the regenerative motors of 15D and 15E, result in zero reaction torque on the satellite. Both spin axes will precess counter-clockwise, if a force into the plane of FIG. 8A is applied at the top of 15D, an opposite force at the bottom of 15D, a force into the plane at the bottom of 1E, and an opposite force at the top of 15E. This will result in counter-clockwise precession. Reversing these forces will result in clockwise precession. Likewise, precession around an axis in the plane, orthogonal to the 2 spin axes, will result, by applying opposing forces to the top and bottom of 15D and 15E, so one rotor assembly is torqued clockwise and the other counterclockwise. And likewise, this precession is opposite, if torques are reversed.

With the 2 spin axes parallel to the satellite roll axis, the precession torques are related to pitch and yaw rates by:

Yaw Precession Torque=[Flywheel Inertia]×[Flywheel Spin Speed]×[Pitch Rate]

and

Pitch Precession Torque=[Flywheel Inertia]×[Flywheel Spin Speed]×[Yaw Rate].

To effect a pitch maneuver, the radial servos can exert variable torque in the yaw plane, equal and opposite, on the two rotors, as described above with reference to FIG. 8A. This will cause a pitch precession rate, related to the yaw torque, flywheel inertia, and flywheel spin speed, as expressed by the 2 equations hereabove. It should be noted that angular acceleration, to achieve a given pitch precession rate, requires torque in the pitch plane, which acts as a negative pitch precession torque, tending to cause rotor axis compliance to the applied yaw precession torque. The total yaw compliance, to achieve a desired pitch rate, is proportional to the maximum pitch rate needed to accomplish a desired maneuver. If the radial servos apply the yaw precession torques, (i.e., act as torquers) the spin axes will tilt in compliance to it, relative to their stators, during acceleration. At constant regenerative motor spin speed, at the ends of maneuvers, this tilt is canceled during pitch deceleration, as the yaw precession torque is reduced to zero.

Likewise, to effect a yaw maneuver, the radial servos can exert pitch torque, equal and opposite, on the two rotors, again as expressed by the 2 equations hereabove. Spin-axis tilt (i.e., compliance to precession torque along axis of torque), of each rotor relative to its stator's adjacent components, should not exceed a degree or so, to maintain rotor-to-stator alignment required for normal flywheel battery performance. This tilt, from desired rotor to stator alignment, accumulates during the spacecraft's angular acceleration. It is proportional to maximum angular speed needed for a pitch or yaw maneuver and the spacecraft's total angular inertia. It can be conveniently reset to zero by opposite precession, during end-of-maneuver deceleration, and can be trimmed by slight spin speed changes between maneuver start and end.

This compliance tilt is equal to

[(max angular speed)(total angular inertia)]/[(flywheel spin speed) (flywheel inertia)]radians.

From this equation, suppose a yaw maneuver at a maximum angular speed of 1 rpm is required, and spacecraft angular inertia about the yaw axis is 400× that of the flywheel rotor assembly, spinning at 40,000 rpm. Then the flywheel spin axis compliance tilt would amount to 0.01 radian=0.6 degree, during the yaw maneuver, and would be inherently reset to zero, during the end of maneuver deceleration. That amount of misalignment during maneuvers is only temporary, and can be accommodated.

Satellite attitude control by precession, along 2 perpendicular axes, can thus be achieved with 2 flywheels. The 2 flywheels, with equal and opposite spin vectors as shown in FIG. 8A, are virtually unaffected by satellite rotation parallel to their 2 spin axes, because spin speed is likely to be 40,000 times the maximum speed of a satellite rotation. They cannot control satellite rotation parallel to their spin axis by precession. But they can control satellite rotation parallel to their spin axes by using the precise torque and speed control of the regenerative motor set forth in the present invention as a 2-flywheel reaction wheel (sometimes called a momentum wheel).

In prior art this mode of applying a flywheel to satellite attitude control is known as a reaction wheel, because it uses reaction torque from the motor to achieve angular satellite acceleration. It is also known as a momentum wheel, because flywheel momentum is exchanged with satellite momentum. In this operating mode, one of the 2 spin vectors shown in FIG. 5A is preferably accelerated while the other is decelerated. This accomplishes a maneuver with little power expended, because the decelerating flywheel supplies most of the power needed by the accelerating flywheel. Thus, they can exchange their controlled and variable momentum with the satellite to which they are affixed.

It is unlikely that power storage/regeneration needs and 3-axis satellite attitude control by this 2-flywheel combination can be simultaneously met, during the reaction wheel mode hereabove described. Other mission resources and priorities must be considered, to solve conflicting satellite power and attitude control requirements. However, the 2-flywheel combination has advantages over the others described here, if the spacecraft needs to continually rotate. By selecting that axis of rotation so it is parallel to the spin axes, no precession torques are needed on the 2 flywheel rotor assemblies. With the 3-flywheel and 4-flywheel combinations, constant radial forces by the radial electromagnets, on the rotor assemblies, would compromise the minimal idling losses of the present invention.

Figure 8B:
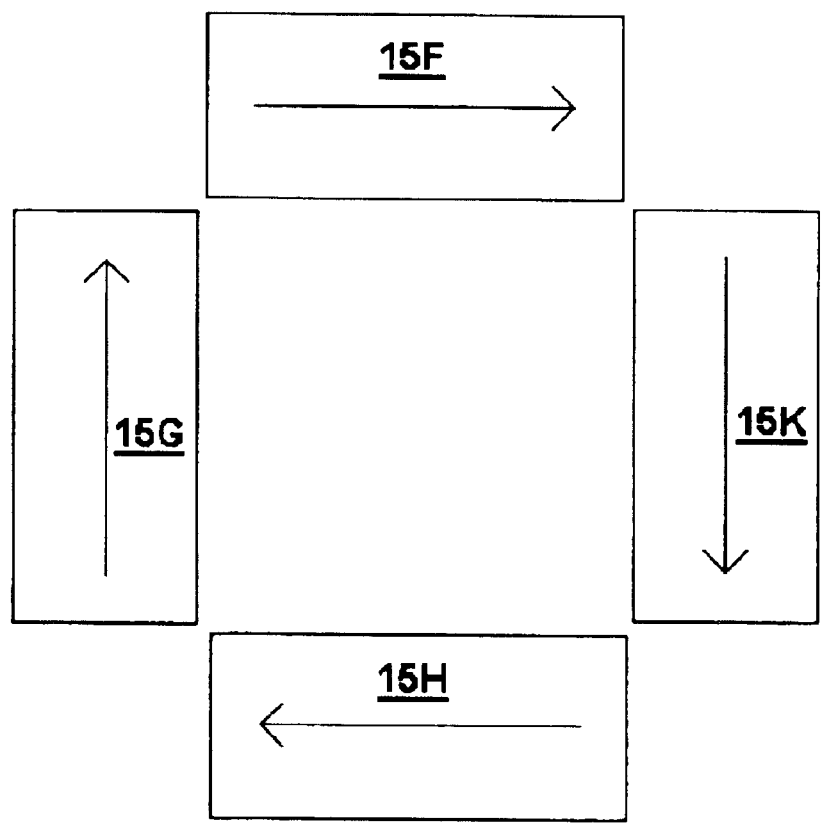
FIG. 8B illustrates a combination of 4 flywheel systems, shown as 2 parallel paired rectangles positioned 90° apart in the plane of the drawing, affixed to an orbital satellite having solar panels, to provide it power storage and regeneration plus 3-axis attitude control. The arrow shown within each rectangle represents the spin vector of the corresponding flywheel rotor.

FIG. 8B shows 4 flywheels 90° apart, affixed to a spacecraft, for ultra-reliable power storage and regeneration, plus simultaneous spacecraft attitude control by precession responsive to radial force commands. Note that vector summation of the 4 spin vectors shown can always be zero, so long as the 4 systems are identical and their spin speeds are always equal to each other.

If all 4 rotor assemblies are pulled up from the plane of FIG. 8B at the heads of arrows that designate their respective spin vectors, and pulled down at the tails of each, all 4 rotor assemblies will precess clockwise. Likewise, if this equal torquing on all 4 is reversed, all 4 will precess counter-clockwise. And if 15F is torqued clockwise while 15H is torqued counter-clockwise, 15F and 15H will precess, along with the spacecraft, around an axis parallel to the spin vectors of 15G and 15K. Reversing the torque polarities will result in reverse precession. Likewise, if 15G is torqued clockwise while 15K is torqued counter-clockwise, 15G and 15K will precess, along with the spacecraft, around an axis parallel to 15F and 15H.

It will be appreciated that reaction forces and torques will cancel each other, for every attitude control maneuver example described here. It will also be appreciated that each precession maneuver is around an axis that is mutually perpendicular to the other 2 maneuvers. So roll, pitch, and yaw maneuvers can be executed by commanding prescribed opposing forces to a selected radial servo pair at opposite ends and opposite sides in a selected flywheel pair.

Flywheel precession control is achieved by accurately "torquing" flywheel bearings from a "torquer" motor, in some prior art attitude control of satellites. However, in this prior art, the flywheel, its motor, torquer, and gimbals included therewith, have mechanical bearings. Their crucially needed lubrication is difficult to maintain in the vacuum of space. Bearing failures of prior art systems consequently limit service lifetimes of the satellites.

Since the present invention needs no mechanical bearings to support rotating or otherwise moving parts, it has no wear-out mechanisms. It would therefore greatly improve reliability and expected zero-maintenance service lifetime, of spacecraft attitude control systems.

And its simultaneous electric power storage and regeneration would provide far higher reliability and far longer service life, compared to the electrochemical batteries now used.

For terrestrial applications, the flywheel batteries provided by the present invention would facilitate distributed building-integral photovoltaic panels and wind turbines. Existing and very troublesome lead-acid batteries, now used for their power storage, are obstacles to their wider implementation. The present invention could facilitate sustainable, environmentally responsible energy on a vast global scale. Safe flywheel siting provisions described herein would provide energy by systems far safer and far more benign than from existing nuclear, fossil fuel, coal, oil, natural gas, and hydrogen sources. Those benefits span existing mining, processing, delivery, storage, and use considerations. The present invention also facilitates viable, sustainable, and environmentally responsible energy alternatives to tenuous conventional sources.

Clearly, the more robust and versatile flywheel systems, provided by the present invention set forth herein, rely far more than the prior art on enhanced electronics and servo loops.

New configurations and combinations, provided by the present invention, include:

(1) Axial magnetic support for the rotor assembly, by a robust axial servo loop which controls electromagnet coils to provide bi-directional axial force, cannot weaken associated magnets, and adjusts axial position to consume virtually zero steady-state power, (2) Power interface electronics with a more efficient PWM switching sequence, for controlling polyphase sinusoidal stator current which drives the regenerative motor, plus power-up and power-down algorithms, which enable systems that tolerate operator error and respond to an incipient failure discriminator to help prevent catastrophic system failures;

(3) EMI suppression, which shields sensors otherwise susceptible to signal degradation caused by EMI emanated from high switch-mode power in nearby components;

(4) Radial servo loops which, cooperative with passive centering, consume virtually zero idling power, and can exert precise precession torques in flywheel system combinations aboard satellites, for executing satellite angular maneuvers.

It will be appreciated that this invention may have many variations in addition to those described by example herein, with appropriate embodiments of constituent elements herein described to best suit a particular situation. Accordingly, it is intended that the claims as set forth hereinafter cover all such applications, embodiments, and variations thereto within the true spirit and scope of this invention.

I claim:

1. A flywheel system intended for terrestrial use, for storing electric power from a DC power buss as kinetic energy and returning power to said buss with minimal losses, comprising:

motor/generator means, including polyphase stator windings for conducting polyphase sinusoidal currents, which are formed from multi-strand insulated conductors for eddy blocking and bucking, a permanent-magnet rotor for providing radial flux that interacts with said currents, and rotor angle sensors, for providing polyphase feedback signals which vary essentially sinusoidally with rotor angle;

power interface electronics, connected to the DC power buss and to the polyphase stator windings of the motor/generator, said electronics responsive to the rotor angle sensors and to the DC buss voltage, for controlling polyphase current through the stator windings so its resultant magnetic field rotates synchronously with the rotor, and also responsive to power-up and power-down algorithms, and to other commands;

a vacuum enclosure, containing mounting therein for the motor/generator, a rim affixed to its rotor, the rotor angle sensors, magnetic bearings, EMI shielding means, and hermetic connections to power interface electronics outside the enclosure;

a flywheel rim, attached to and surrounding the rotor and coaxial therewith, the combination having a vertical spin axis, to provide rotary inertia for storing kinetic energy;

axial servo means, including axial position sensors, an annular permanent-magnet and coil with concentric magnetic materials above the rotor to lift and passively center it, plus a coil and concentric magnetic materials below the rotor to alternately apply a downward force, and servo electronics that includes an integrator to adjust axial rotor position for zero coil currents at steady-state;

radial servo means, having electronics responsive to radial position sensors at the rotor top and bottom, including radial electromagnets aligned thereto, for radially centering the rotor by forces from magnetic fields with flux paths substantially radial and axial in the rotor, plus dead-band means wherein steady-state centering is maintained by passive axial magnetics and gravity;

vibration discriminator means, responsive to signals from the axial and radial servos, for initiating a power-down algorithm;

mechanical backup bearings, near the top and bottom of the rotor, and normally not in contact with it, for supporting the rotor when the axial and radial servos are not operating.

2. A flywheel system intended for use onboard orbital satellites, for storing electric power from a DC power buss as kinetic energy and returning power to said buss with minimal losses, and for controlling the satellite angular attitude, comprising:

motor/generator means, including polyphase stator windings for conducting polyphase sinusoidal currents, which are formed from multi-strand insulated conductors for eddy blocking and bucking, a permanent-magnet rotor for providing radial flux that interacts with said currents, and rotor angle sensors, for providing polyphase feedback signals which vary essentially sinusoidally with rotor angle;

power interface electronics, connected to the DC power buss and to the polyphase stator windings of the motor/generator, said electronics responsive to the rotor angle sensors and to the buss voltage, for controlling polyphase current through the stator windings so its resultant magnetic field rotates synchronously with the rotor, and also responsive to power-up and power-down algorithms, and to other commands;

a flywheel assembly housing, containing mounting therein for the motor/generator, a rim affixed to its rotor, the rotor angle sensors, magnetic bearings, EMI shielding means, and connections to power interface electronics;

a flywheel rim, attached to and surrounding the rotor and coaxial therewith, for providing rotary inertia, axial servo means, including axial position sensors, an annular permanent-magnet and coil with concentric magnetic materials above the rotor to lift and passively center it at the top, plus a like magnet and coil and concentric magnetic materials below the rotor, to provide alternately opposing axial force and passive centering at the bottom, and servo electronics that includes an integrator to adjust axial rotor position for zero coil currents at steady-state;

radial servo means, including electronics responsive to radial position sensors at the rotor top and bottom, including radial electromagnets aligned thereto, for radially centering the rotor by forces from magnetic fields with flux paths substantially radial and axial in the rotor, plus dead-band means wherein steady-state centering is maintained by passive axial magnetics, plus means to apply equal opposing radial forces at opposite ends, for producing precession torques;

vibration discriminator means, responsive to signals from the axial and radial servos, for initiating a power-down algorithm;

mechanical backup bearings, near the top and bottom of the rotor, and normally not in contact with it, for supporting the rotor when the axial and radial servos are not operating.

3. The power interface electronics in claim 1, comprising:

signal processing means, responsive to the rotor angle sensors, the DC power buss voltage, to the vibration discriminator, and to input commands, for controlling PWM H-bridges;

PWM H-bridges, responsive to the signal processing means, connected, with parallel capacitors, across the DC power buss, and through series output inductors to respective stator windings, including diagonal pairs of switch-mode transistors wherein one transistor of each pair has turn-off delay in drive mode, for controlling sinusoidal polyphase currents through the stator windings, and for exchanging DC current with the DC power buss;

a vibration discriminator, responsive to signals from the axial and radial servos, including comparators which monitor amplitudes and durations above prescribed levels of said signals, and provide an output signal when said amplitudes and durations exceed prescribed levels;

power-up algorithm means, initiated by an operator command signal, to control a sequence of coordinated actions by the flywheel system, that include disengaging the mechanical backup bearings and enabling drive to the regenerative motor;

power-down algorithm means, initiated externally by an operator command signal and internally by a signal from the vibration discriminator, to control a sequence of coordinated actions by the flywheel system, that include inhibiting drive to the regenerative motor, decelerating the rotor assembly, and engaging the mechanical backup bearings.

4. The motor/generator in claim 1, comprising:

polyphase stator windings, formed from multi-strand conductors that provide means for blocking and bucking eddy currents therein, embedded in a non-magnetic cylinder affixed to the enclosure, to conduct polyphase currents varying sinusoidally with rotor angle so the resulting stator field is synchronized to rotor angle, for producing torque between the rotor and the stator, and for exchanging electric power with the power interface electronics without incurring hysteresis and eddy losses, rotor angle sensor means, for providing polyphase feedback signals which vary sinusoidally with rotor angle;

at least one pair of rotor magnets, with one magnet of the pair magnetized radially outward and the other magnetized radially inward, to provide flux, which varies substantially sinusoidally with rotor angle, through the stator windings;

an outer cylinder of high-permeability steel, for supporting the magnets attached therein and for providing an outer flux return path;

an inner cylinder of high-permeability steel, attached to the outer cylinder, for providing an inner flux return path, and for completing through the stator windings a flux pattern which rotates synchronously with the rotor;

cylindrical high-permeability steel, attached therewith, for completing peripheral magnetic paths for the rotor field through the rotor angle sensors, to shield the rotor angle sensors from magnetic fields caused by stator current, and to prevent magnetic cycling in stator materials from the rotating peripheral rotor field.

5. The axial servo means in claim 1, comprising:

a fixed annular permanent-magnet, with high-permeability annular steel poles, above the rotor assembly, within and supported by the vacuum enclosure, to provide an axial magnetic field uniform with rotor angle in an annular gap region above the rotor assembly;

an annular, concentric coil, affixed to the permanent-magnet and steel poles above the rotor assembly, for adjusting and stabilizing the magnetic field in the upper annular gap region;

a second annular, concentric coil, affixed to annular steel poles below the rotor assembly, for alternately adjusting and stabilizing the magnetic field in the lower annular gap region;

rotatable annular high-permeability steel poles, attached to the rotor assembly near its top, and juxtaposed beneath the fixed permanent-magnet, poles, and concentric coil, to provide axial lift and radial centering forces, for the rotor assembly;

rotatable annular high-permeability steel poles, attached to the rotor assembly near its bottom, and juxtaposed above the lower fixed poles and concentric coil, to alternately provide downward force, to cooperate in axially positioning and stabilizing the rotor assembly;

axial position sensors, for detecting the rotor assembly axial position;

axial servo loops, responsive to the axial position sensors, for controlling current through the concentric coils, to stabilize and adjust axial position of the rotor assembly;

integrator means, responsive to the concentric coil current, for adjusting axial position of the rotor and flywheel, so that long-term coil current is reduced to nearly zero.

6. The radial servo means in claim 1, comprising:

four radial electromagnets at each end of the rotor assembly, positioned as opposing pairs 90° apart, each including a coil around high-permeability steel, its two poles in juxtaposition with the rotor to conduct a magnetic field having a substantially radial and axial path in the rotor, for providing radial attraction forces between the electromagnets and cooperating cylindrical high-permeability steel attached to and coaxial with the rotor assembly, with minimal flux cycling and no flux reversal in the cooperating magnetic materials;

four radial position sensors, each aligned with a corresponding radial electromagnet;

four radial servos, responsive to the radial position sensors, for controlling current through the coils of the radial electromagnets, including dead-band means, for inhibiting said current when the flywheel assembly spin-axis is centered within tolerance and rate of radial motion is less than a prescribed level, to maintain spin-axis centering and verticality during normal operation, by passive magnetics and gravity.

7. The polyphase stator windings in claim 4, each comprising:

a group of conductor strands, each insulated from the other, formed in their inactive region between their two straight axial active segments, so as to interchange strands about the group center, to equalize, between winding terminal connections, back-EMF of each strand.

8. The polyphase stator windings in claim 4, each comprising:

a group of conductor strands, each insulated from the others between winding terminal connections, the group spiraled, to equalize, between winding terminal connections, back-EMF of each strand.

9. Mechanical backup bearings as in claim 1, for axially and radially supporting the rotor assembly when the axial and radial servo means are not operating, comprising:

a fixed surface contact pad, not normally in contact with any rotor assembly part during system operation, near the top of the rotor assembly;

an axially movable surface contact pad near the bottom of the rotor assembly, that can be moved and supported by a motor-driven jackscrew mechanism responsive to power-up and power-down algorithms, which can lift the pad to engage a bottom surface contact pad affixed to the rotor assembly, and can alternately lower the pad to disengage;

a surface contact pad, affixed to the rotor assembly near its top, in juxtaposition with the fixed surface contact pad near the top of the rotor assembly;

a surface contact pad, affixed to the rotor assembly near its bottom, in juxtaposition with the axially movable pad.

10. The axial position sensor in claim 1, comprising:

high-frequency oscillator means, to supply an excitation voltage, a pair of fixed and opposing conductive exciter rings, connected to the excitation voltage;

a pair of rotatable conductive rings, attached to the rotor assembly by means of an insulating annular member and having surfaces capacitively coupled to the exciter rings;

a pair of fixed conductive sensor rings, capacitively coupled to the rotatable rings, for providing opposing signals responsive to capacitance between the sensor rings and rotatable rings in series with capacitance between the exciter rings and rotatable rings.

11. The radial position sensors in claim 1, at each end of the rotor assembly, each comprising:

high-frequency oscillator means, to supply an excitation voltage;

a fixed conductive exciter cylinder, connected to the excitation voltage;

a rotatable conductive cylinder, attached to the rotor assembly by means of an insulating annular member, and having a surface capacitively coupled to the exciter cylinder;

four fixed sensor electrodes, 90° apart, capacitively coupled to the rotatable cylinder, for providing two signal pairs, each pair responsive to capacitance difference between opposing sensor electrodes and the rotatable cylinder.

12. The power interface electronics in claim 2, comprising:

signal processing means, responsive to the rotor angle sensors, the DC power buss voltage, to the vibration discriminator, and to input commands, for controlling PWM H-bridges;

PWM H-bridges, responsive to the signal processing means, connected, with parallel capacitors, across the DC power buss, and through series output inductors to respective stator windings, including diagonal pairs of switch-mode transistors wherein one transistor of each pair has turn-off delay in drive mode, for controlling sinusoidal polyphase currents through the stator windings, and for exchanging DC current with the DC power buss;

a vibration discriminator, responsive to signals from the axial and radial servos, including comparators which monitor amplitudes and durations above prescribed levels of said signals, and provide an output signal when said amplitudes and durations exceed prescribed levels;

power-up algorithm means, initiated by an operator command signal, to control a sequence of coordinated actions by the flywheel system, that include disengaging the mechanical backup bearings and enabling drive to the regenerative motor;

power-down algorithm means, initiated externally by an operator command signal and internally by a signal from the vibration discriminator, to control a sequence of coordinated actions by the flywheel system, that include inhibiting drive to the regenerative motor, decelerating the rotor assembly, and engaging the mechanical backup bearings;

means for linking the power interface of each flywheel system, in combinations of systems aboard a satellite, to match regenerative motor torques and speeds of each system.

13. The motor/generator in claim 2, comprising:

polyphase stator windings, formed from multi-strand conductors that provide means for blocking and bucking eddy currents therein, embedded in a non-magnetic cylinder affixed to the enclosure, to conduct polyphase currents varying sinusoidally with rotor angle so the resulting stator field is synchronized to rotor angle, for producing torque between the rotor and the stator, and for exchanging electric power with the power interface electronics without incurring hysteresis and eddy losses;

rotor angle sensor means, for providing polyphase feedback signals which vary substantially sinusoidally with rotor angle;

at least one pair of rotor magnets, with one magnet of the pair magnetized radially outward and the other magnetized radially inward, to provide flux, which varies sinusoidally with rotor angle, through the stator windings;

an outer cylinder of high-permeability steel, for supporting the magnets attached therein and for providing an outer flux return path;

an inner cylinder of high-permeability steel, attached to the outer cylinder, for providing an inner flux return path, and for completing through the stator windings a flux pattern which rotates synchronously with the rotor;

cylindrical high-permeability steel, attached therewith, for completing peripheral magnetic paths for the rotor field through the rotor angle sensors, to shield the rotor angle sensors from magnetic fields caused by stator current, and to prevent magnetic cycling in stator materials from the peripheral rotor field.

14. The axial servo means in claim 2, comprising:

a fixed annular permanent-magnet, with high-permeability annular steel poles, above the rotor assembly, within and supported by the flywheel assembly housing, to provide an axial magnetic field uniform with rotor angle in an annular gap region above the rotor assembly;

an annular, concentric coil, affixed to the permanent-magnet and steel poles above the rotor assembly, for adjusting and stabilizing the magnetic field in the upper annular gap region;

a like magnet and concentric coil, affixed to annular steel poles below the rotor assembly, for alternately adjusting and stabilizing the magnetic field in the lower annular gap region;

rotatable annular high-permeability steel poles, attached to the rotor assembly near its top, and juxtaposed beneath the upper fixed permanent-magnet, poles, and concentric coil, to cooperatively provide upward magnetic force and passive radial centering forces there, for the rotor assembly;

rotatable annular high-permeability steel poles, attached to the rotor assembly near its bottom, and juxtaposed above the lower fixed poles, magnet, and concentric coil, to alternately cooperatively provide downward force, for axially positioning and stabilizing the rotor assembly, and passively centering it there;

axial position sensors, for detecting the rotor assembly axial position;

axial servo loops, responsive to the axial position sensors, for controlling current through the concentric coils, to stabilize and adjust axial position of the rotor assembly;

integrator means, responsive to the concentric coil current, for adjusting axial position of the rotor and flywheel, so that long-term coil current is reduced to nearly zero.

15. The radial servo means in claim 2, comprising:

four radial electromagnets at each end of the rotor assembly, positioned as opposing pairs 90° apart, each including a coil around high-permeability steel, its two poles in juxtaposition with the rotor to conduct a magnetic field having a substantially radial and axial path in the rotor, for providing radial attraction forces between the electromagnets and cooperating cylindrical high-permeability steel attached to and coaxial with the rotor assembly, with minimal flux cycling and no flux reversal in the cooperating magnetic materials;

four radial position sensors, each aligned with a corresponding radial electromagnet;

four radial servos, responsive to the radial position sensors, for controlling current through the coils of the radial electromagnets, to maintain spin-axis centering and alignment;

a force sensor between each electromagnet core and its support, each said sensor to provide a signal proportional to the radial force therebetween;

a precession torque command loop associated with each servo, to selectively apply equal opposing radial forces at opposite ends of the rotor assembly, for applying precession torque to the rotor assembly.

16. The polyphase stator windings in claim 13, each comprising:

a group of conductor strands, each insulated from the other, formed in their inactive region between their two straight axial active segments, so as to interchange strands about the group center, to equalize, between winding terminal connections, back-EMF of each strand.

17. The polyphase stator windings in claim 13, each comprising:

a group of conductor strands, each insulated from the others between winding terminal connections, the group spiraled, to equalize, between winding terminal connections, back-EMF of each strand.

18. Mechanical backup bearings as in claim 2, for axially and radially supporting the rotor assembly when the axial and radial servo means are not operating, comprising:

a fixed surface contact pad, not normally in contact with any rotor assembly part during system operation, near the top of the rotor assembly;

an axially movable surface contact pad near the bottom of the rotor assembly, that can be moved and supported by a motor-driven jackscrew mechanism responsive to power-up and power-down algorithms, which can lift the pad to engage a bottom surface contact pad affixed to the rotor assembly, and can alternately lower the pad to disengage;

a surface contact pad, affixed to the rotor assembly near its top, in juxtaposition with the fixed surface contact pad near the top of the rotor assembly;

a surface contact pad, affixed to the rotor assembly near its bottom, in juxtaposition with the axially movable pad.

19. Mechanical backup bearings as in claim 2, for axially and radially supporting the rotor assembly when the axial and radial servo means are not operating, so that both axial support magnets have closed magnetic paths, comprising:

a fixed surface contact pad, not normally in contact with any rotor assembly part during system operation, near the top of the rotor assembly;

a surface contact pad, affixed to the rotor assembly near its top, in juxtaposition with the fixed surface contact pad near the top of the rotor assembly;

a component group, including the lower axial magnet, associated steel poles, and concentric electromagnet coil, including a surface contact pad attached therewith, near the bottom of the rotor assembly, where the group can be moved axially and supported by a motor-driven jackscrew mechanism responsive to the power-up and power-down algorithms, so that the jackscrew can lift the group whereby the attached pad engages a bottom surface contact pad affixed to the rotor assembly, and whereby the jackscrew can alternately lower the group to disengage the pads;

a surface contact pad, affixed to the rotor assembly near its bottom, in juxtaposition with the axially movable pad.

20. The axial position sensor in claim 2, comprising:

high-frequency oscillator means, to supply an excitation voltage;

a pair of fixed and opposing conductive exciter rings, connected to the excitation voltage;

a pair of rotatable conductive rings, attached to the rotor assembly by means of an insulating annular member and having surfaces capacitively coupled to the exciter rings;

a pair of fixed conductive sensor rings, capacitively coupled to the rotatable rings, for providing opposing signals responsive to capacitance between the sensor rings and rotatable rings in series with capacitance between the exciter rings and rotatable rings.

21. The radial position sensors in claim 2, at each end of the rotor assembly, each comprising:

high-frequency oscillator means, to supply an excitation voltage;

a fixed conductive exciter cylinder, connected to the excitation voltage;

a rotatable conductive cylinder, attached to the rotor assembly by means of an insulating annular member, and having a surface capacitively coupled to the exciter cylinder;

four fixed sensor electrodes, 90° apart, capacitively coupled to the rotatable cylinder, for providing two signal pairs, each pair responsive to capacitance difference between opposing sensor electrodes and the rotatable cylinder.

22. Mechanical backup bearings as in claim 1, near each end of the rotor assembly, each bearing also including:

a ball bearing having a fixed outer race and a rotatable inner race, and a plurality of load-bearing balls therebetween, which roll in contact with the inner and outer race;

separators between each of the balls, formed from thin-wall tubing of a spring material, each having a neck at its center to maintain rolling contact with two balls, and having necks near both of its ends for maintaining rolling contact with idler races;

outer idler races at both sides of the bearing, to provide outer raceways for the necks of each separator near their respective ends;

inner idler races at both sides of the bearing, to provide inner raceways for the necks of each separator near their respective ends;

axial grooves along the inner circumference of the inner idler race, to increase its radial compliance during assembly;

a cover at each side of the bearing, each having a radially rigid inner shoulder to stiffen the adjoining inner idler race;

means for affixing the covers to the outer race of the ball bearing.

23. Axial servo electronics as in claim 1, including:

current rectifier and filter means, connected to respective sensor electrodes, for removing the high-frequency component from the signals provided by the sensor rings;

differential amplifier means, for providing two amplified signal pairs, responsive to the rotor assembly radial position and excursion rate;

operational amplifier means, for providing pairs of outputs to respective axial servo PWM electromagnet coil drives, proportional to the difference between the amplified opposing signals and excursion rate, and the output of an integrator;

said integrator, responsive to the difference of current in the two coils.

24. Radial servo electronics as in claim 1, including:

current rectifier and filter means, connected to respective sensor electrodes, for removing the high-frequency component from signals provided by the sensor electrodes;

differential amplifier means, for providing two amplified signal pairs, responsive to the rotor assembly radial position;

operational amplifier means, for providing pairs of outputs to respective radial servo PWM electromagnet coil drives, proportional to the difference between the amplified opposing signals and excursion rate, having a prescribed dead-band.

25. Three of the flywheel systems recited in claim 2, arrayed in combination, affixed to a satellite so that the spin vectors of their respective rotor assemblies are parallel to a common plane and separated 120° from each other, and each having radial servos responsive to precession torque commands, wherein:

a pair of the flywheel systems, each having a radial electromagnet of one in the pair with means to apply a radial force parallel to the plane at the arrow-head end of its rotor assembly spin axis, while the electromagnet at its opposite end applies an opposite force, and having a like radial electromagnet of the second flywheel system in the pair to apply a like but opposite, radial force at a similarly disposed end, while the electromagnet at its opposite end applies an opposite radial force, so that opposing precession torques parallel to the plane are applied to the two rotor assemblies of that flywheel system pair, for causing satellite precession around the third flywheel system spin axis;

the three flywheel systems, each having a like disposed radial electromagnet with means to apply radial force to its rotor assembly at the arrow-bead end of its spin axis, perpendicular to the plane, while the three electromagnets at the other ends of the three rotor assemblies apply opposite forces perpendicular to the plane, for causing satellite precession around an axis perpendicular to the plane.

26. Two of the flywheel systems recited in claim 2, arrayed in combination, affixed to a satellite so that the spin vectors of their respective rotor assemblies are in a common plane and 180° from each other, each having radial servos responsive to precession torque commands, wherein:

one of the two flywheel systems, having a radial electromagnet at one end of its rotor assembly with means to apply a radial force to it, perpendicular to the plane, while the radial electromagnet at its other end applies an opposite radial force, and the radial electromagnets of the second flywheel system apply like opposite radial forces, so that opposing precession torques parallel to the plane are applied to the two rotor assemblies, for causing satellite precession around an axis perpendicular to the plane;

one of the two flywheel systems, having a radial electromagnet at one end of its rotor assembly with means to apply a radial force to it, parallel to the plane, while the radial electromagnet at its other end applies an opposite radial force, and the radial electromagnets of the second flywheel system apply like opposite radial forces, so that opposing precession torques perpendicular to the plane are applied to the two rotor assemblies, for causing satellite precession around an axis perpendicular to the spin axes and parallel to the plane;

the regenerative motor of one flywheel system, with means to apply torque to accelerate its rotor assembly around its spin axis, while the regenerative motor of the second flywheel system applies torque to decelerate its rotor assembly, so that their combined reaction torques rotate the satellite around an axis parallel to the flywheel system spin axes.

27. Four of the flywheel systems recited in claim 2, arrayed in combination, affixed to a satellite so that the spin vectors of their respective rotor assemblies are in a plane, with a first pair 180° from each other, and a like second pair disposed 90° from the first pair, and each having radial servos responsive to precession torque commands, wherein:

the four flywheel systems, each having a radial electromagnet at the arrow-head end of each rotor assembly spin vector, with means to apply a radial force perpendicular to the plane, while the radial electromagnet at the opposite end applies an opposite force of equal magnitude, for causing satellite precession around an axis perpendicular to the plane;

the radial electromagnet at the arrow-head of a first rotor assembly spin vector, with means to apply a force parallel to the plane, while the radial electromagnetic at its opposite end applies an opposite radial force of equal magnitude, while like but opposite radial forces are applied to a second rotor assembly whose spin vector is disposed 180° from the first, so that opposing precession torques parallel to the plane are applied to the two rotor assemblies, for causing satellite precession around the spin axes of the other two rotor assemblies.

28. The EMI shielding means in claim 1, comprising:

high-magnetic-permeability annular steel, for providing closed magnetic flux paths for the rotor magnets, through the rotor angle sensors, for preventing this rotating peripheral flux from cycling stator material, and for suppressing magnetic fields from current in the stator conductors from reaching the rotor angle sensors.

29. The EMI shielding means in claim 1, comprising:

high-current-conductivity segments between and connected to grounded annular axial magnetics poles, including small radial spaces between the segments, for intercepting EMI from PWM voltage applied to the axial electromagnet coils.

30. The EMI shielding means in claim 1, comprising:

high-current-conductivity segments around each radial electromagnet coil, connected to ground and to respective radial electromagnet cores, including small insulating spaces between the segments, for intercepting EMI from high-frequency components of PWM voltage applied to the radial electromagnet coils.

31. The EMI shielding means in claim 1, comprising:

a high-current-conductivity annular member affixed to and concentric with the rotor assembly, and connected to other concentric conductors affixed to the rotor assembly, juxtaposed with two fixedly positioned high-conductivity annular members, one connected to the negative signal input of a high-bandwidth amplifier, whose positive signal input is connected to signal ground, and whose output is connected to the second annular member, for suppressing EMI in the rotor assembly by capacitive EMI detection and rejection.

32. The EMI shielding means in claim 2, comprising:

high-magnetic-permeability annular steel, for providing closed magnetic flux paths for the rotor magnets, through the rotor angle sensors, for preventing this rotating peripheral flux from cycling stator material, and for suppressing magnetic fields from current in the stator conductors from reaching the rotor angle sensors.

33. The EMI shielding means in claim 2, comprising:

high-current-conductivity segments between and connected to grounded annular axial magnetics poles, including small radial spaces between the segments, for intercepting EMI from PWM voltage applied to the axial electromagnet coils.

34. The EMI shielding means in claim 2, comprising:

high-current-conductivity segments around each radial electromagnet coil, connected to ground and to respective radial electromagnet cores, including small insulating spaces between the segments, for intercepting EMI emanating from high-frequency components of PWM voltage applied to the radial electromagnet coils.

35. The EMI shielding means in claim 2, comprising:

a high-current-conductivity annular member affixed to and concentric with the rotor assembly, and connected to other concentric conductors affixed to the rotor assembly, juxtaposed with two fixedly positioned high-conductivity annular members, one connected to the negative signal input of a high-bandwidth amplifier whose positive signal input is connected to signal ground, and whose output is connected to the second annular member, for suppressing EMI in the rotor assembly by capacitive EMI detection and rejection.

36. Axial servo electronics as in claim 2, including:

current rectifier and filter means, connected to respective sensor electrodes, for removing the high-frequency component from the signals provided by the sensor rings;

differential amplifier means, for providing two amplified signal pairs, responsive to the rotor assembly radial position and excursion rate;

operational amplifier means, for providing pairs of outputs to respective axial servo PWM electromagnet coil drives, proportional to the difference between the amplified opposing signals and excursion rate, and the output of an integrator;

said integrator, responsive to the difference of current in the two coils.

37. Radial servo electronics as in claim 2, including:

current rectifier and filter means, connected to respective sensor electrodes, for removing the high-frequency component from signals provided by the sensor electrodes;

differential amplifier means, for providing two amplified signal pairs, responsive to the rotor assembly radial position;

operational amplifier means, for providing pairs of outputs to respective radial servo PWM electromagnet coil drives, proportional to the difference between the amplified opposing signals and excursion rate, having a prescribed dead-band;

differential amplifier means, responsive to a force command signal and to output from an associated force sensor, for driving one of two associated radial electromagnets, to apply a radial force at one end of the rotor assembly, while an equal and opposite radial force is applied to the other end of the rotor assembly by a like radial servo, to cause precession torque.

38. Mechanical backup bearings as in claim 2, near each end of the rotor assembly, each bearing also including:

a ball bearing having a fixed outer race and a rotatable inner race, and a plurality of load-bearing balls therebetween, which roll in contact with the inner and outer race;

separators between each of the balls, formed from thin-wall tubing of a spring material, each having a neck at its center to maintain rolling contact with two balls, and having necks near both of its ends for maintaining rolling contact with idler races;

outer idler races at both sides of the bearing, to provide outer raceways for the necks of each separator near their respective ends;

inner idler races at both sides of the bearing, to provide inner raceways for the necks of each separator near their respective ends;

axial grooves along the inner circumference of the inner idler race, to increase its radial compliance during assembly;

a cover at each side of the bearing, each having a radially rigid inner shoulder to stiffen the adjoining inner idler race;

means for affixing the covers to the outer race of the ball bearing.

39. A combination of the flywheel systems recited in claim 1, each having power interface electronics connected in parallel with like systems to a DC power buss, for providing a combined system having total power and energy capacity equal to the sum of the power and energy capacities of the connected systems.

40. A combination of the flywheel systems recited in claim 2, each having power interface electronics connected in parallel with like systems to a DC power buss, for providing a combined system having total power and energy capacity equal to the sum of the power and energy capacities of the connected systems, and for exchanging power between the connected systems.

* * * * *